United States Patent
Hornick

(10) Patent No.: US 7,620,635 B2
(45) Date of Patent: Nov. 17, 2009

(54) DATA MINING AGENTS FOR EFFICIENT HARDWARE UTILIZATION

(75) Inventor: Mark Hornick, Waltham, MA (US)

(73) Assignee: Oracle International Corporation, Redwood Shores, CA (US)

( * ) Notice: Subject to any disclaimer, the term of this patent is extended or adjusted under 35 U.S.C. 154(b) by 367 days.

(21) Appl. No.: 11/094,083

(22) Filed: Mar. 31, 2005

(65) Prior Publication Data

US 2005/0177549 A1    Aug. 11, 2005

Related U.S. Application Data

(62) Division of application No. 09/917,763, filed on Jul. 31, 2001, now Pat. No. 6,912,533.

(51) Int. Cl.
*G06F 7/00* (2006.01)
*G06F 17/17* (2006.01)

(52) U.S. Cl. ............... 707/10; 707/3; 707/204; 709/203

(58) Field of Classification Search ............... 707/1–10, 707/100–104.1, 200–206; 709/201, 217, 709/219
See application file for complete search history.

(56) References Cited

U.S. PATENT DOCUMENTS

| | | | |
|---|---|---|---|
| 5,692,174 A * | 11/1997 | Bireley et al. | 707/3 |
| 5,692,182 A * | 11/1997 | Desai et al. | 707/10 |
| 5,920,855 A | 7/1999 | Aggarwal et al. | |
| 5,978,588 A | 11/1999 | Wallace | |
| 6,094,531 A | 7/2000 | Allison et al. | |
| 6,240,411 B1 | 5/2001 | Thearling | |
| 6,266,668 B1 | 7/2001 | Vanderveldt et al. | |
| 6,460,037 B1 | 10/2002 | Weiss et al. | |
| 6,865,573 B1 * | 3/2005 | Hornick et al. | 707/6 |

FOREIGN PATENT DOCUMENTS

GB        2336007 A    6/1999

OTHER PUBLICATIONS

Bordetsky., Agent-based support for collaborative data mining in systems management, Jan. 3-6, 2001, IEEE, 1-9.*
Rana et al., PaDDMAS: parallel and distributed data mining application suite, May 1-5, 2000, IEEE, 387-392.*

* cited by examiner

*Primary Examiner*—Jean B Fleurantin
(74) *Attorney, Agent, or Firm*—Hanify & King, P.C.

(57) ABSTRACT

A method, system, and computer program product for allocating data mining processing tasks that does not use complex internal schemes, yet results in better performance than is possible with general-purpose operating system based schemes. The present invention uses a data mining agent that operates autonomously, proactively, reactively, deliberatively, and cooperatively to allocate and reallocate data mining processing tasks among computer systems, and/or among processors. The data mining agent reacts to its own environment, determines if a data mining activity can be completed as expected, solicits bids from other data mining agents, determines if another data mining system could complete the data mining activity and migrates that data mining activity to the selected data mining system.

72 Claims, 11 Drawing Sheets

US 7,620,635 B2

DATA MINING AGENTS FOR EFFICIENT HARDWARE UTILIZATION

CROSS-REFERENCE TO RELATED APPLICATIONS

This application is a divisional of application of application Ser. No. 09/917,763, filed Jul. 31, 2001, now U.S. Pat. No. 6,912,533, which is hereby incorporated by reference.

FIELD OF THE INVENTION

The present invention relates to allocating data mining processing tasks using data mining agents that provide efficient hardware utilization of the data mining system.

BACKGROUND OF THE INVENTION

Data mining is a technique by which hidden patterns may be found in a group of data. True data mining doesn't just change the presentation of data, but actually discovers previously unknown relationships among the data. Data mining is typically implemented as software in or in association with database systems. Data mining includes several major steps. First, data mining models are generated based on one or more data analysis algorithms. Initially, the models are "untrained", but are "trained" by processing training data and generating information that defines the model. The generated information is then deployed for use in data mining, for example, by providing predictions of future behavior based on specific past behavior.

Data mining typically involves the processing of large amounts of data, which consumes significant hardware resources. As a result, it is desirable to configure the data mining software system for efficient utilization of the hardware resources. This may present a problem. For example, if a data mining software system is configured to use all of the processors of a given hardware system, the data mining software system must either perform complex internal allocation of tasks to multiple threads/processes, or the data mining software system must allow the operating system to perform the allocation. If internal allocation is used, significant complexity is added to the data mining software system. This can cause difficulties in generating, debugging, and maintaining the data mining software system. If the operating system is used to perform allocation, the operating system will typically use a general-purpose allocation scheme. This general purpose allocation scheme cannot produce optimal usage of resources since data mining demands and behavior are significantly different than those that the typical general purpose allocation scheme has been designed to handle.

An additional problem may arise if, once a data mining processing task has started execution, the hardware system servicing the task becomes overloaded due to other tasks being executed. This may cause degradation in the performance of the data mining processing task, or, in some cases, cause the data mining processing task to become unexecutable. For example, if a data mining processing task requires a certain minimum number of processors to execute and the number of available processors is always fewer than that minimum, due to other tasks, the data mining processing task will never execute. This is unacceptable from a performance standpoint, since the typical data mining system expects a data mining processing task to run to completion in its current environment, without interruption.

A need arises for a technique by which data mining processing tasks may be allocated without complex internal schemes, yet resulting in better performance than is possible with general-purpose operating system based schemes.

SUMMARY OF THE INVENTION

The present invention is a method, system, and computer program product for allocating data mining processing tasks that does not use complex internal schemes, yet results in better performance than is possible with general-purpose operating system based schemes. The present invention uses a data mining agent that operates autonomously, proactively, reactively, deliberatively and cooperatively to allocate and reallocate data mining processing tasks among computer systems, and/or among processors.

In one embodiment, the present invention is a method of data mining performed in a data mining agent executing in a computer system, the method comprising the steps of examining a request queue comprising at least one request for data mining processing, determining if the at least one request for data mining processing can be processed, accepting the at least one request for data mining processing if it is determined that the at least one request for data mining processing can be processed, and processing the accepted request for data mining processing in the computer system.

In one aspect of this embodiment of the present invention, the determining step comprises the steps of determining if an algorithm required to process the at least one request for data mining processing is supported by the computer system, if the algorithm required to process the at least one request for data mining processing is supported, determining whether the computer system is available for additional processing, if the computer system is not available for additional processing, determining whether the computer system will become available for additional processing before other computer systems that might process the at least one request, if the computer system is available for additional processing, or if the computer system will become available for additional processing before other computer systems that might process the at least one request, determining whether the computer system will be able to complete requested processing in an allotted time, and if the computer system will be able to complete the requested processing in the allotted time, determining that the computer system can process the at least one request for data mining processing. The at least one request for data mining processing comprises data defining at least one algorithm that must be performed in order to perform the requested data mining processing. There is data defining algorithms that are supported by the computer system. The step of determining if an algorithm required to process the at least one request for data mining processing is supported comprises comparing the data defining at least one algorithm that must be performed in order to perform the requested data mining processing with data defining algorithms that are supported by the computer system. The data defining at least one algorithm that must be performed in order to perform the requested data mining processing and the data defining algorithms that are supported by the computer system are in extensible markup language format.

In one aspect of this embodiment of the present invention, the step of determining whether the computer system is available for additional processing comprises the step of determining whether available idle time of the computer system is greater than a predefined or a dynamically calculated threshold.

In one aspect of this embodiment of the present invention, the computer system comprises a plurality of processors and the step of determining whether the computer system is available for additional processing comprises the step of determining whether any of the plurality of processors is available for additional processing. The step of determining whether any of the plurality of processors is available for additional processing comprises the step of determining, for each of the plurality of processors, whether available idle time of the processor is greater than a predefined or a dynamically calculated threshold.

In one aspect of this embodiment of the present invention, the step of determining whether the computer system is available for additional processing comprises the step of determining availability of the computer system for additional processing relative to at least one other computer system.

In one aspect of the present invention, the step of determining whether the computer system will become available for additional processing before other computer systems that might process the at least one request comprises the steps of estimating a time to availability of the computer system, exchanging an estimate of a time to availability of the at least one other computer system, and comparing the time to availability of the computer system with the time to availability of the at least one other computer system. The step of determining whether the computer system will be able to complete requested processing in an allotted time comprises the steps of estimating a time to completion for the requested processing on the computer system, comparing the time to completion for the requested processing on the computer system with time allocation information included in the request for data mining processing.

In one embodiment, the present invention is a method of data mining performed in a data mining agent executing in a computer system, the method comprising the steps of determining that the computer system is overloaded, querying at least one other computer system to determine whether the at least one other computer system can complete a data mining processing task being performed on the computer system faster than the computer system, determining whether the at least one other computer system can complete the data mining processing task being performed on the computer system faster than the computer system, and if the at least one other computer system can complete the data mining processing task faster than the computer system, migrating the processing from the computer system to the at least one other computer system.

In one aspect of this embodiment of the present invention, the migrating step comprises the steps of reserving the at least one other computer system for migration, interrupting and checkpointing the data mining processing task on the computer system, and enqueueing a request to the at least one other computer system for continued processing of the data mining processing task.

In one aspect of this embodiment of the present invention, the step of determining that the computer system is overloaded comprises the step of determining that the computer system is overloaded if a utilization of a processor of the computer system is greater than a predefined threshold for a predefined time.

In one aspect of this embodiment of the present invention, the querying step comprises the step of generating an estimate of a time to complete the data mining processing task. The generating step comprises the steps of estimating an amount of processing that must be performed to complete the data mining processing task, estimating a processor utilization that will be available to process the data mining processing task, and estimating a time to complete the data mining processing task based on the estimate of the amount of processing that must be performed, the estimate of available processor utilization, and a speed of the processor. The querying step further comprises the step of requesting information from the at least one other computer system, the information including a speed of the at least one other computer system and an estimate of processor utilization of the at least one other computer system.

In one aspect of this embodiment of the present invention, the step of determining whether the at least one other computer system can complete a data mining processing task being performed on the computer system faster than the computer system comprises the step of estimating a time to complete the data mining processing task for the at least one other computer system based on the estimate of the amount of processing that must be performed to complete the data mining processing task, the speed of the at least one other computer system and the estimate of processor utilization of the at least one other computer system. The step of determining whether the at least one other computer system can complete a data mining processing task being performed on the computer system faster than the computer system further comprises the steps of adding an estimate of a time to migrate the data mining processing task to the at least one other computer system and the estimate of the time to complete the data mining processing task for the at least one other computer system, comparing the estimate of the time to complete the data mining processing task for the computer system with the estimate of the time to complete the data mining processing task for the at least one other computer system, and determining whether the at least one other computer system can complete the data mining processing task being performed on the computer system faster than the computer system.

In one aspect of this embodiment of the present invention, the querying step further comprises the step of transmitting to the at least one other computer system the estimate of the amount of processing that must be performed to complete the data mining processing task, and receiving from the at least one other computer system an estimate of a time to complete the data mining processing task for the at least one other computer system In one aspect of this embodiment of the present invention, the step of determining whether the at least one other computer system can complete a data mining processing task being performed on the computer system faster than the computer system further comprises the steps of adding an estimate of a time to migrate the data mining processing task to the at least one other computer system and the estimate of the time to complete the data mining processing task for the at least one other computer system, comparing the estimate of the time to complete the data mining processing task for the computer system with the estimate of the time to complete the data mining processing task for the at least one other computer system, and determining whether the at least one other computer system can complete the data mining processing task being performed on the computer system faster than the computer system.

In one embodiment, the present invention is a method of data mining performed in a data mining agent executing in a computer system, the method comprising the steps of determining that a processing load in the computer system is high relative to at least one other computer system, determining a remaining cost of completing processing of a data mining processing task being processed by the computer system, determining whether the at least one other computer system can complete processing of the data mining processing task at a lower cost than the computer system, and if the at least one other computer system can complete processing of the data mining processing task at a lower cost than the computer system, migrating processing of the data mining processing task to the at least one computer system.

In one aspect of this embodiment of the present invention, the step of determining that a processing load in the computer system is high relative to at least one other computer system comprises the steps of determining a processor utilization of the computer system, determining a processor utilization of the at least one other computer system, and determining that the processor utilization of the computer system is greater than a predefined amount higher than the processor utilization of the at least one other computer system.

In one aspect of this embodiment of the present invention, the remaining cost of completing processing of a data mining processing task may be determined based on a time to complete processing of the data mining processing task. The remaining cost of completing processing of a data mining processing task may be determined based on a time to complete processing of the data mining processing task and on additional factors, including actual costs of use of the computer system. The step of determining a remaining cost of completing processing of a data mining processing task being processed by the computer system may comprise the steps of estimating an amount of processing that must be performed to complete the data mining processing task, estimating a processor utilization that will be available to process the data mining processing task, and estimating a time to complete the data mining processing task based on the estimate of the amount of processing that must be performed, the estimate of available processor utilization, and a speed of the processor. The method may further comprise the step of estimating additional factors, including actual costs of use of the computer system.

In one aspect of this embodiment of the present invention, the step of determining whether the at least one other computer system can complete processing of the data mining processing task at a lower cost than the computer system comprises the step of soliciting a bid for completing processing of the data mining processing task from the at least one other computer system.

In one aspect of this embodiment of the present invention, the soliciting step comprises the steps of transmitting a request for a bid to the at least one other computer system, the request for the bid including information relating to the amount of processing that must be performed to complete the data mining processing task, and receiving a bid from the at least one other computer system, the bid including an estimate of a cost of completing processing of the data mining processing task on the at least one other computer system.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
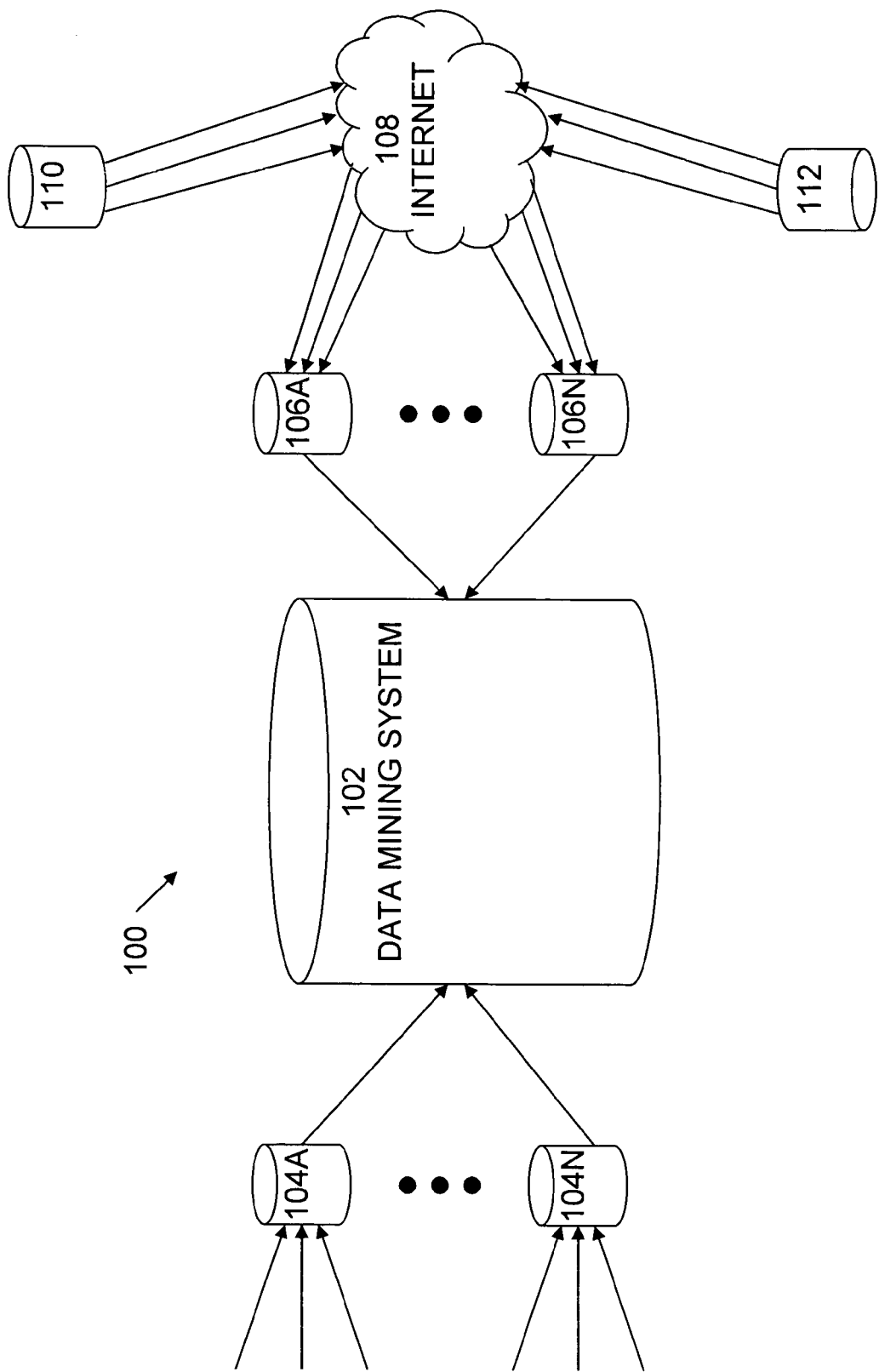
FIG. 1 is an exemplary block diagram of a data mining system, in which the present invention may be implemented.

An exemplary data mining system 100, in which the present invention may be implemented, is shown in FIG. 1. System 100 includes a data mining system 102 that is connected to a variety of sources of data. For example, system 102 may be connected to a plurality of internal or proprietary data sources, such as systems 104A-104N. Systems 104A-104N may be any type of data source, warehouse, or repository, including those that are not publicly accessible. Examples of such systems include inventory control systems, accounting systems, scheduling systems, etc. System 102 may also be connected to a plurality of proprietary data sources that are accessible in some way over the Internet 108. Such systems include systems 106A-106N, shown in FIG. 1. Systems 106A-106N may be publicly accessible over the Internet 108, they may be privately accessible using a secure connection technology, or they may be both publicly and privately accessible. System 102 may also be connected to other systems over the Internet 108. For example, system 110 may be privately accessible to system 102 over the Internet 108 using a secure connection, while system 112 may be publicly accessible over the Internet 108.

The common thread to the systems connected to system 102 is that the connected systems all are potential sources of data for system 102. The data involved may be of any type, from any original source, and in any format. System 102 has the capability to utilize and all such data that is available to it.

Figure 2:
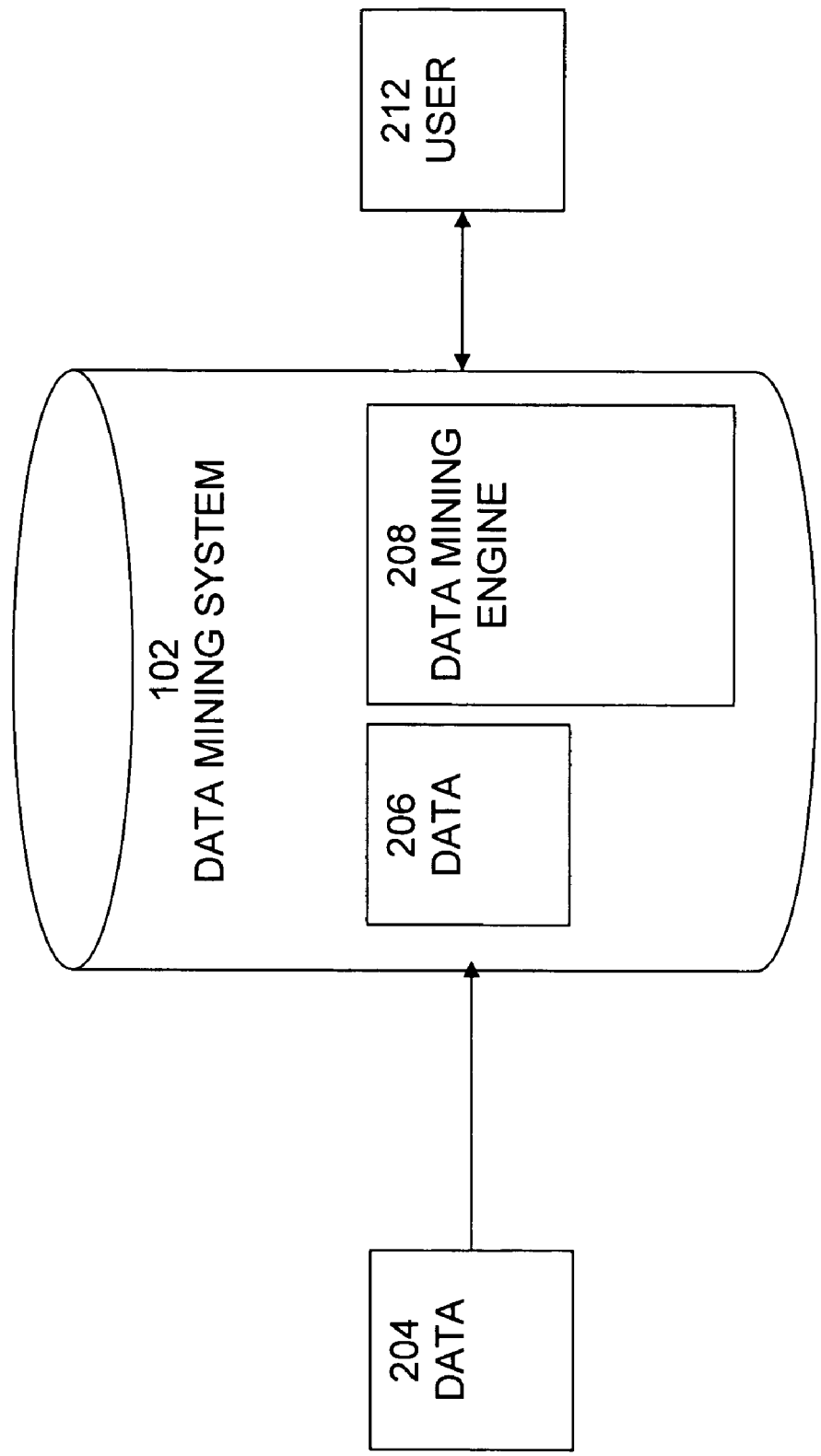
FIG. 2 is an exemplary block diagram of a database/data mining system shown in FIG. 1.

An exemplary embodiment of data mining system 102 is shown in FIG. 2. Data mining system 102 utilizes data, such as externally stored data 204 and internally stored data 206, which is obtained from data sources such as the proprietary and public data sources shown in FIG. 1. Data mining system 102 also includes data mining engine 208. Externally stored data 204 is typically stored in a database management system and is accessed by data mining system 102. The database management system typically includes software that receives and processes queries of the database, such as those received from data mining system 102, obtains data satisfying the queries, and generates and transmits responses to the queries, such as to data mining system 102. Internally stored data 206 contemplates an embodiment in which data mining engine 208 is combined with, or implemented on, a database management system. In either case, data 204 or 206 includes data, typically arranged as a plurality of data tables, such as relational data tables, as well as indexes and other structures that facilitate access to the data. Data mining engine 208 performs data mining processes, such as processing data to generate data mining models and responding to requests for data mining results from one or more users, such as user 212.

Figure 3:
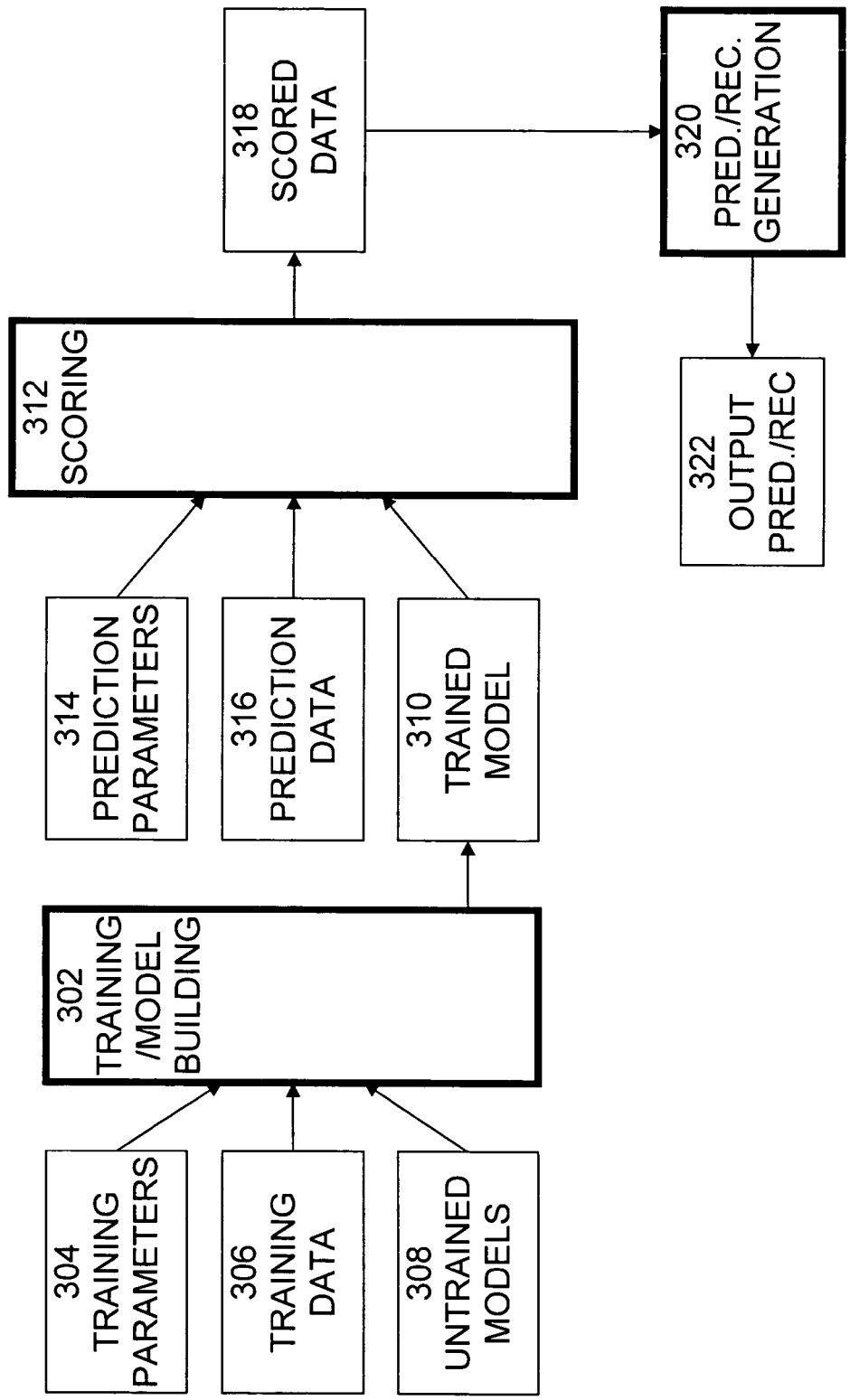
FIG. 3 is an exemplary data flow diagram of a data mining process, which may be implemented in the system shown in FIG. 1.

An exemplary data flow diagram of a data mining process, which may be performed by data mining engine 208, including building and scoring of models and generation of predictions/recommendations, is shown in FIG. 3. The training/model building step 302 involves generating the models that are used to perform data mining recommendation/prediction, clustering, association rule generation, etc. The inputs to training/model building step 302 include training parameters 304, training data 306, and untrained models 308. For some types of models, such as neural network or self-organizing map models, untrained models 308 may include initialized or untrained representations of the models in addition to algorithms that process the training data 306 in order to actually build the models. Such a representation includes a structural representation of the model that either does not actually contain data that makes up the model, or contains only default data or parameters. The actual data or parameters are generated and entered into the representation during training/model building step 302 by the model building algorithms. For other types of models, such as tree models or association rule models, untrained models 308 do not include untrained representations of the models, but only include the algorithms that process the training data 306 in order to actually build the models. Training parameters 304 are parameters that are input to the data-mining model building algorithms to control how the algorithms build the models. Training data 306 is data that is input to the algorithms and which is used to actually build the models. Model building can also partition "build data" into training, evaluation, and test datasets. The evaluation dataset can be used by the model building algorithm to avoid overtraining, while the test dataset can be used to provide error estimates of the model.

Training/model building step 302 invokes the data mining model building algorithms included in untrained models 308, initializes the algorithms using the training parameters 304, processes training data 306 using the algorithms to build the model, and generates trained model 310. Trained model 310 may include rules that implement the conditions and decisions that make up the operational model, for those types of models that use rules. As part of the process of building trained model 310, trained model 310 is evaluated and, for example, in the case of decision tree models, those rules that decrease or do not contribute to the quality, i.e. prediction accuracy, of the model are eliminated from the model. The remaining rules of trained model 310 are encoded in an appropriate format and are deployed for use in making predictions or recommendations. For those types of models that do not use rules, such as neural networks, the trained model 310 includes an appropriate representation of the model encoded in an appropriate format and deployed for use in making predictions or recommendations Scoring step 312 involves using the deployed trained model 310 to make predictions or recommendations based on new data that is received. Trained model 310, prediction parameters 314, and prediction data 316 are input to scoring step 312. Trained models 310 include one or more sets of deployed rules that were generated by model building step 302. Prediction parameters 314 are parameters that are input to the scoring step 318 to control the scoring of trained model 310 against prediction data 316 and are input to the selection and prediction/recommendation step 320 to control the selection of the scored rules and the generation of predictions and recommendations Prediction data 316 is processed according to deployed rules or other representation of the model included in trained model 310, as controlled by prediction parameters 314. In the case of a rule based model, scores are generated for prediction data 316 based upon each rule in the set of deployed rules included in trained model 310. Typically, a trained model 310 can be defined in terms of a function of input variables producing a prediction/recommendation based on the input variables. The function is evaluated using the input prediction data 316 and scores are generated. The scores indicate how closely the function defined by the model matches the prediction data, how much confidence may be placed in the prediction, how likely the output prediction/recommendation from the model is to be true, and other statistical indicators. Scored data 318 is output from scoring step 312 and includes predictions or recommendations for each scored record in prediction data 316, along with corresponding probabilities for each scored record. Scored data 318 is input to selection and prediction/recommendation generation step, which evaluates the probabilities associated with each record of scored data 318 and generates predictions/recommendations based on the scored data. Records may be selected based on prediction parameters 314 provided by the user, for example, to filter records that do not meet some probability threshold. The generated predictions/recommendations are output 322 from step 320 for use in any post data mining processing.

Figure 4A:
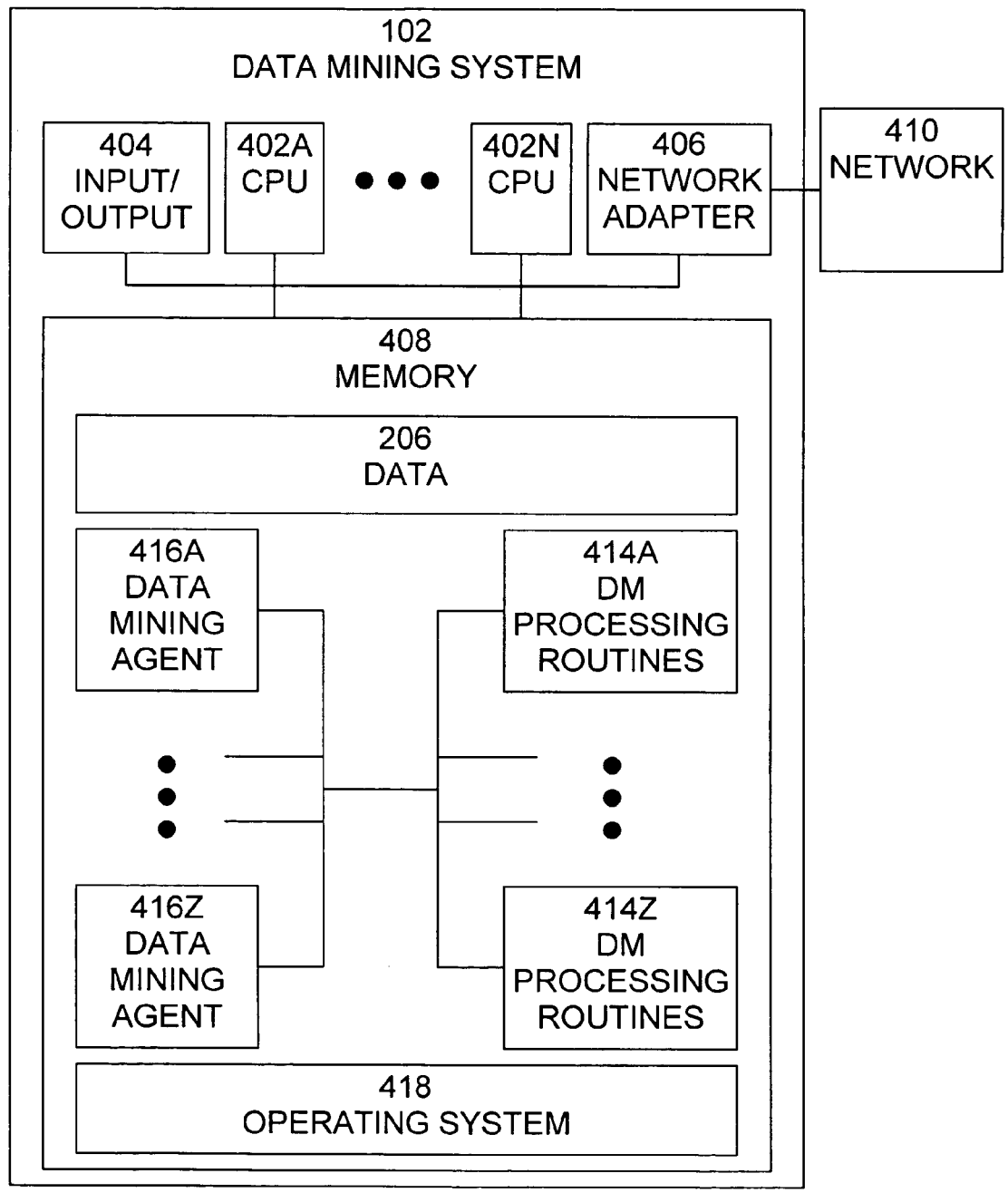
FIG. 4a is an exemplary block diagram of one embodiment of a data mining system shown in FIG. 1.

An exemplary block diagram of one embodiment of a database/data mining system 102, shown in FIG. 1, is shown in FIG. 4a. Database/data mining system 102 is typically a programmed general-purpose computer system, such as a personal computer, workstation, server system, and minicomputer or mainframe computer. Database/data mining system 102 includes one or more processors (CPUs) 402A-402N, input/output circuitry 404, network adapter 406, and memory 408. CPUs 402A-402N executes program instructions in order to carry out the functions of the present invention. Typically, CPUs 402A-402N are one or more microprocessors, such as an INTEL PENTIUM® processor. FIG. 4 illustrates an embodiment in which data mining system 102 is implemented as a single multi-processor computer system, in which multiple processors 402A-402N share system resources, such as memory 408, input/output circuitry 404, and network adapter 406. However, the present invention also contemplates embodiments in which data mining system 102 is implemented as a plurality of networked computer systems, which may be single-processor computer systems, multi-processor computer systems, or a mix thereof.

Input/output circuitry 404 provides the capability to input data to, or output data from, database/data mining system 102. For example, input/output circuitry may include input devices, such as keyboards, mice, touchpads, trackballs, scanners, etc., output devices, such as video adapters, monitors, printers, etc., and input/output devices, such as, modems, etc. Network adapter 406 interfaces database/data mining system 102 with network 410. Network 410 may be any standard local area network (LAN) or wide area network (WAN), such as Ethernet, Token Ring, the Internet, or a private or proprietary LAN/WAN.

Memory 408 stores program instructions that are executed by, and data that are used and processed by, CPU 402 to perform the functions of the database/data mining system 102. Memory 408 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 408 includes data 206, database management processing routines 412, data mining processing routines 414A-414Z, data mining agents 416A-416Z, and operating system 418. Data 206 includes data, typically arranged as a plurality of data tables, such as relational database tables, as well as indexes and other structures that facilitate access to the data. Database management processing routines 412 are software routines that provide database management functionality, such as database query processing.

Data mining processing routines 414A-414Z are software routines that implement the data mining processing performed by the present invention. Data mining processing routines 414A-414Z interact with and are used by data mining agents 418A-418Z. Data mining agents 418A-418Z are software components that perform data mining processing, but which have been enhanced to be capable of flexible, autonomous action in the environment. That is, each data mining agent can operate autonomously, proactively, reactively, deliberatively and cooperatively. Autonomous operation means that the data mining agent has control over its own behavior and internal states. Proactive operation means that the data mining agent can act in anticipation of future goals or tasks. Reactive operation means that the data mining agent can respond in a timely fashion to changes in its environment, including changes in available processing tasks, etc. Deliberative operation means that the data mining agent can reflect on or process received information before acting on that information. Cooperative operation means that the data mining agent can communicate with other data mining agents to coordinate their actions. Operating system 418 provides overall system functionality.

Figure 4B:
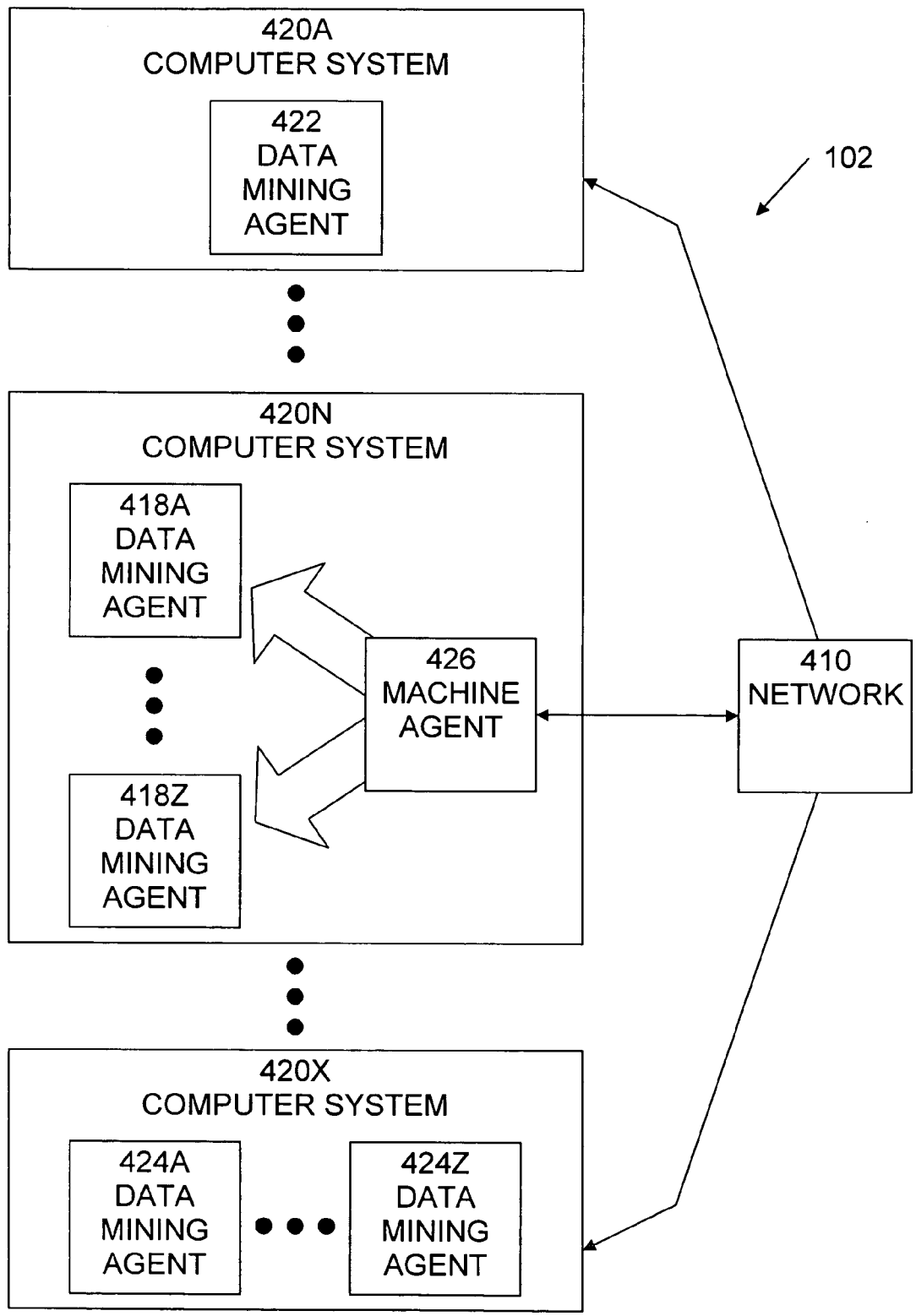
FIG. 4b is an exemplary block diagram of one embodiment of a data mining system shown in FIG. 1.

An exemplary block diagram of another embodiment of a data mining system 102 is shown in FIG. 4b. This embodiment includes a plurality of computer systems, such as computer systems 420A-X, which communicate with each other over network 410. Each computer system 420A-420X includes components similar to those shown in FIG. 4a, but not all of these components are shown in FIG. 4b. Some of the computer systems, such as computer systems 420A and 420X include one or more active, running data mining agents. For example, computer system 420A includes active, running data mining agent 422, while computer system 420X includes a plurality of active, running data mining agents 424A-424Z. Computer system 420N includes machine agent 426. Machine agent 426 is a software component that provides monitoring and coordination capabilities to computer system 420N even in the absence of any active, running data mining agents.

Machine agent 426 is a process that runs in the background and performs a specified operation at predefined times or in response to certain events. In particular, machine agent 426 receives and responds to coordination requests from data mining agents, which allows coordination of the local computer system upon which the machine agent resides (computer system 420N in this case) with other computer systems. Machine agent 426 monitors the configuration, utilization, processing load, and other parameters of the local computer system and can respond to requests requiring such information. Machine agent 426 can also launch data mining agents, such as data mining agents 428A-428Z, if necessary to respond to requests for migration of data mining processing tasks to the local computer system.

Figure 5:
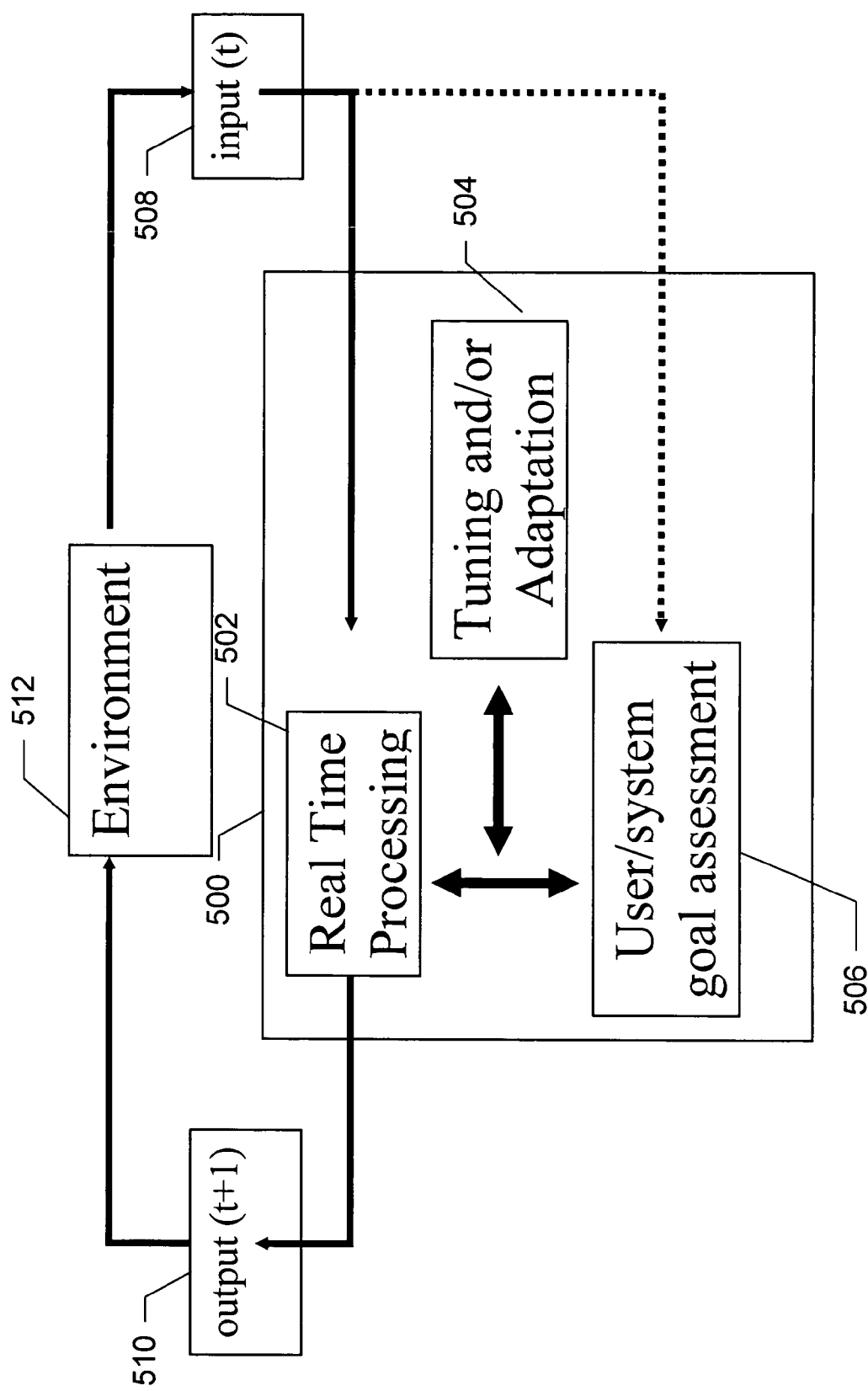
FIG. 5 is an exemplary data flow diagram of processing performed by a data mining agent, according to the present invention.

An exemplary data flow diagram of processing performed by a data mining agent 500 is shown in FIG. 5. Data mining agent 500 includes real time processing 502, tuning and/or adaptation processing 504, and user/system goal assessment 506. Data mining agent 500 accepts input data 508 and performs real time processing 502 on the data to generate output data 510. Input data 508 typically includes data such as data mining model training data, data mining model training parameters, data mining prediction data, and data mining prediction parameters, which is obtained from data sources such as proprietary and public data sources, users of the data mining system, and predefined parameters. Input data 508 may also include system observation data, such as machine CPU usage/load data. Real time processing 502 typically includes processing such as data mining model building, data mining model scoring, and data mining prediction/recommendation generation. Output data 510 typically includes data such as trained data mining models, scored data mining models, and data mining predictions and recommendations. Input data 508 is received from, and output data 510 is transmitted to, environment 512. Environment 512 includes users of data mining processing services, sources of data mining data, other data mining systems with other data mining agents, etc.

User/system goal assessment processing 506 involves monitoring input data 508 to determine goals that users of data mining processing are attempting to achieve and how well those goals are being achieved by, in particular, other data mining systems with other data mining agents that are included in environment 512. In addition, User/system goal assessment processing 506 monitor how well data mining agent 500 is achieving the goal of the data mining processing being performed by data mining agent 500. By monitoring these factors, user/system goal assessment processing 506 allows data mining agent 500 to recognize goals that are not being achieved, whether by other data mining systems with other data mining agents or by data mining agent 500 itself. Tuning and/or adaptation processing 504 provides data mining agent 500 with the capability to respond when it determines that goals are not being achieved by other data mining agents or by data mining agent 500 itself. If the goals are not being achieved by other data mining systems, tuning and/or adaptation processing 504 can coordinate with the other data mining systems to migrate processing of data mining processing tasks from those systems to data mining agent 500 for processing. Likewise, if the goals are not being achieved by data mining agent 500, tuning and/or adaptation processing 504 can coordinate with other data mining systems to migrate processing of data mining processing tasks from data mining agent 500 to the other data mining systems.

Figure 6:
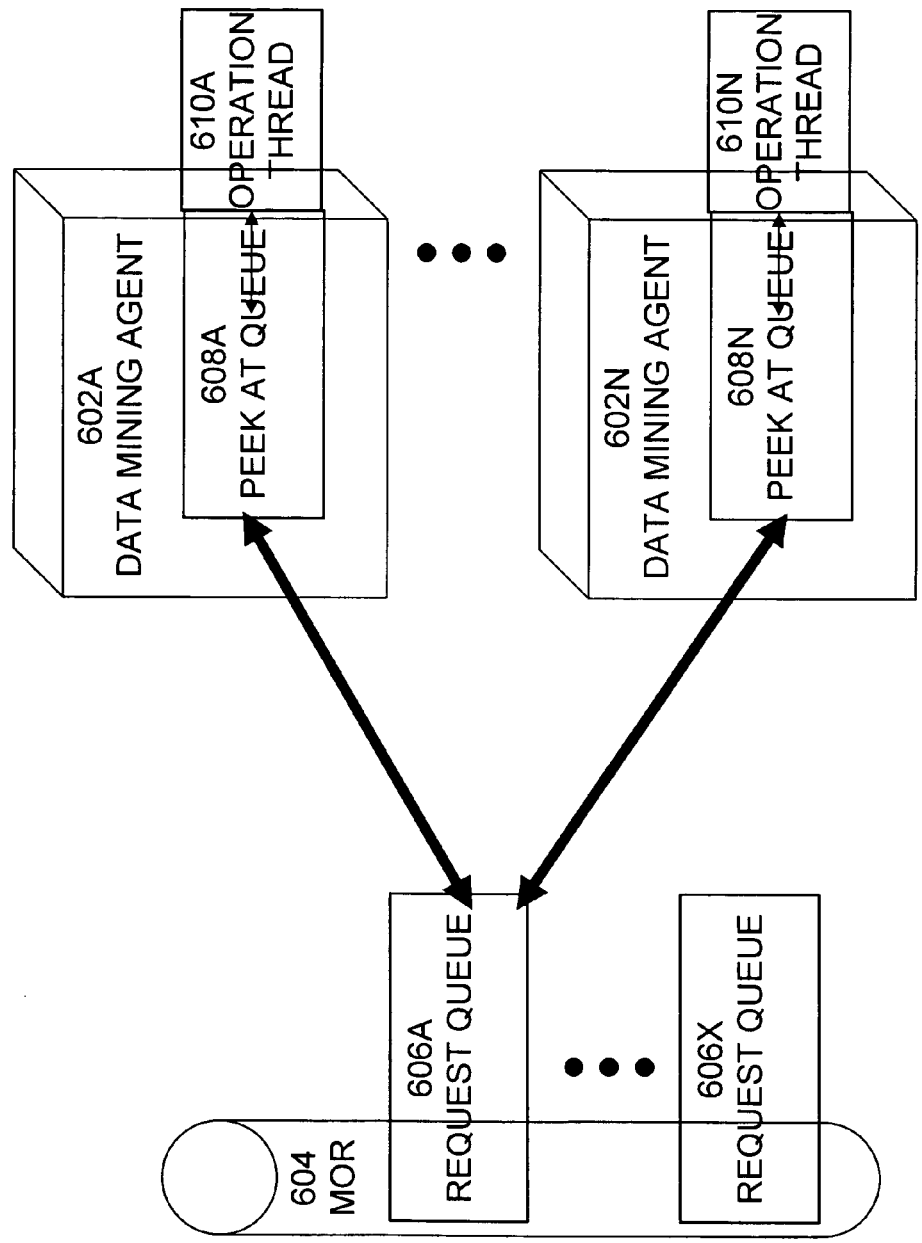
FIG. 6 is an exemplary data flow diagram of data mining agents shown in FIG. 5 selecting tasks to process.

A data flow diagram of data mining agents selecting tasks to process is shown in FIG. 6. As shown in FIG. 6, there are a plurality of data mining agents, such as data mining agents 602A-602N. These data mining agents are software components that are present on one or more computer systems, such as servers. Data mining agents 602A-N are typically distributed among the computer systems. One form of communication among data mining agents 602A-602N is provided by mining object repository (MOR) 604, which serves as a central repository for data mining objects that is accessible by all data mining agents. In particular, MOR 604 includes one or more request queues, such as request queue 606A-606X. Each request queue contains requests for data mining processing received directly or indirectly from data mining users. Request queues 606A-606X may be organized in any way desired. For example, request queues 606A-606X may be organized according to data mining users, types of data mining processing requested, priority levels of the requests, etc. The received requests for data mining processing are typically queued in a first-in-first-out (FIFO) arrangement. However, any request queue organization and any queueing arrangement is contemplated by the present invention. In addition, the MOR 604 is a logical entity and may itself be distributed to provide reliability and fault tolerance. Again, the present invention contemplates any arrangement or distribution of the MOR.

Each data mining agent, such as data mining agent 602A, includes a plurality of processes/threads, such as peek at queue process 608A and operation thread 610A. The peek at queue processes 608A-608N of data mining agents 602A-602N communicate with request queues 606A-606X and examine the queued requests for data mining processing contained therein. The peek at queue processes 608A-608N select requests for data mining processing that are to be processed by each associated data mining agent as shown in FIG. 7.

Figure 7:
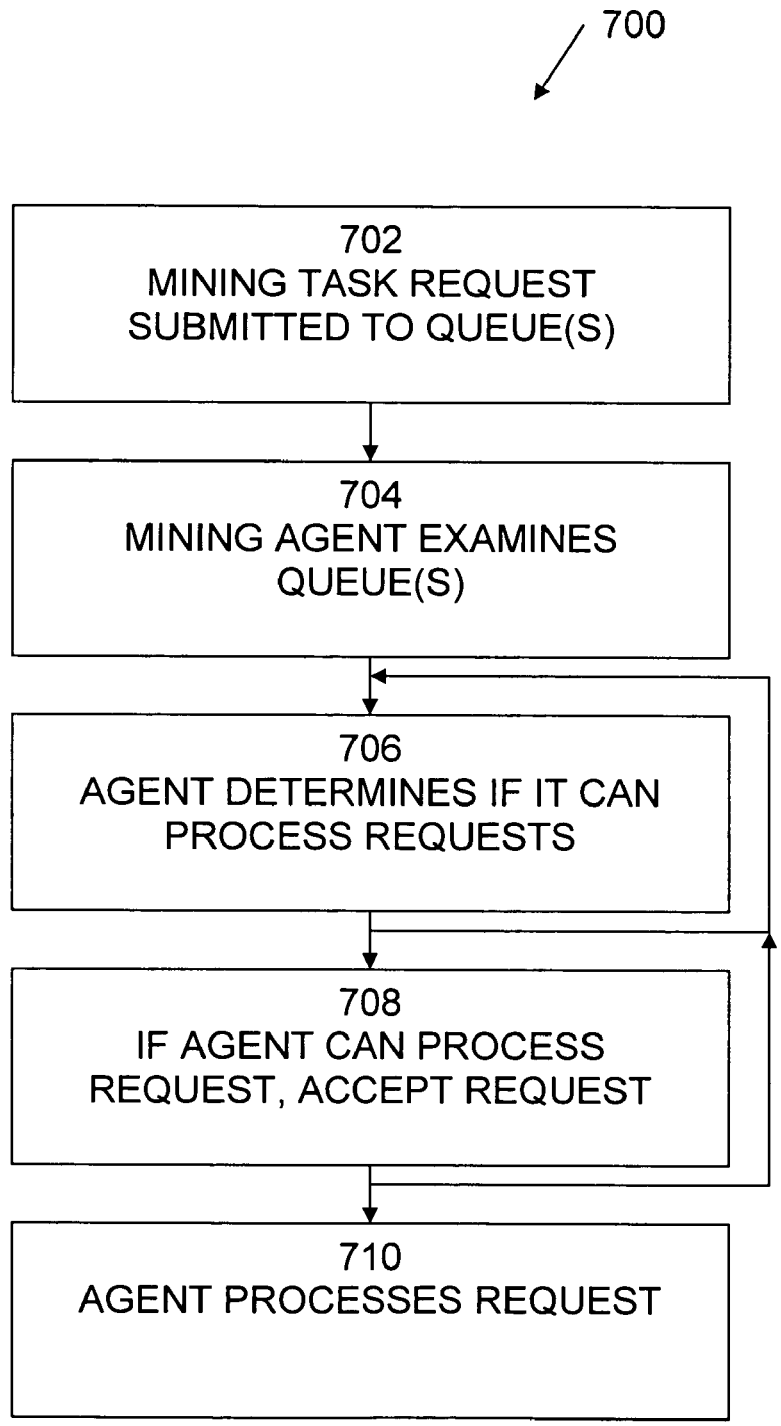
FIG. 7 is an exemplary flow diagram of a data mining processing task request selection process, according to the present invention.

A data flow diagram of a data mining processing task request selection process 700 of a data mining agent is shown in FIG. 7. FIG. 7 is best viewed in conjunction with FIG. 6. Process 700 begins with requests for data mining processing being submitted to request queues 606A-606X, as described above. In step 704, a peek at queue process, such as peek at queue process 608A of data mining agents 602A, examines the queued requests for data mining processing contained therein. Typically, peek at queue processes 608A is proactive, that is, the process actively examines request queues 606A-606X looking for suitable requests to handle. In step 706, peek at queue process 608A determines if its associated data mining agent, data mining agent 602A, is capable of processing each particular request. In step 708, if peek at queue process 608A determines that its associated data mining agent, data mining agent 602A, is capable of processing a particular request, then peek at queue process 608A accepts the request for processing and dequeues that request from the request queue in which it is contained. Steps 706 and 708 are performed repeatedly, with peek at queue process 608A examining any accepted requests until it determines that data mining agent 602A cannot handle any more requests. In step 710, data mining agent 602A processes the accepted requests.

Figure 8:
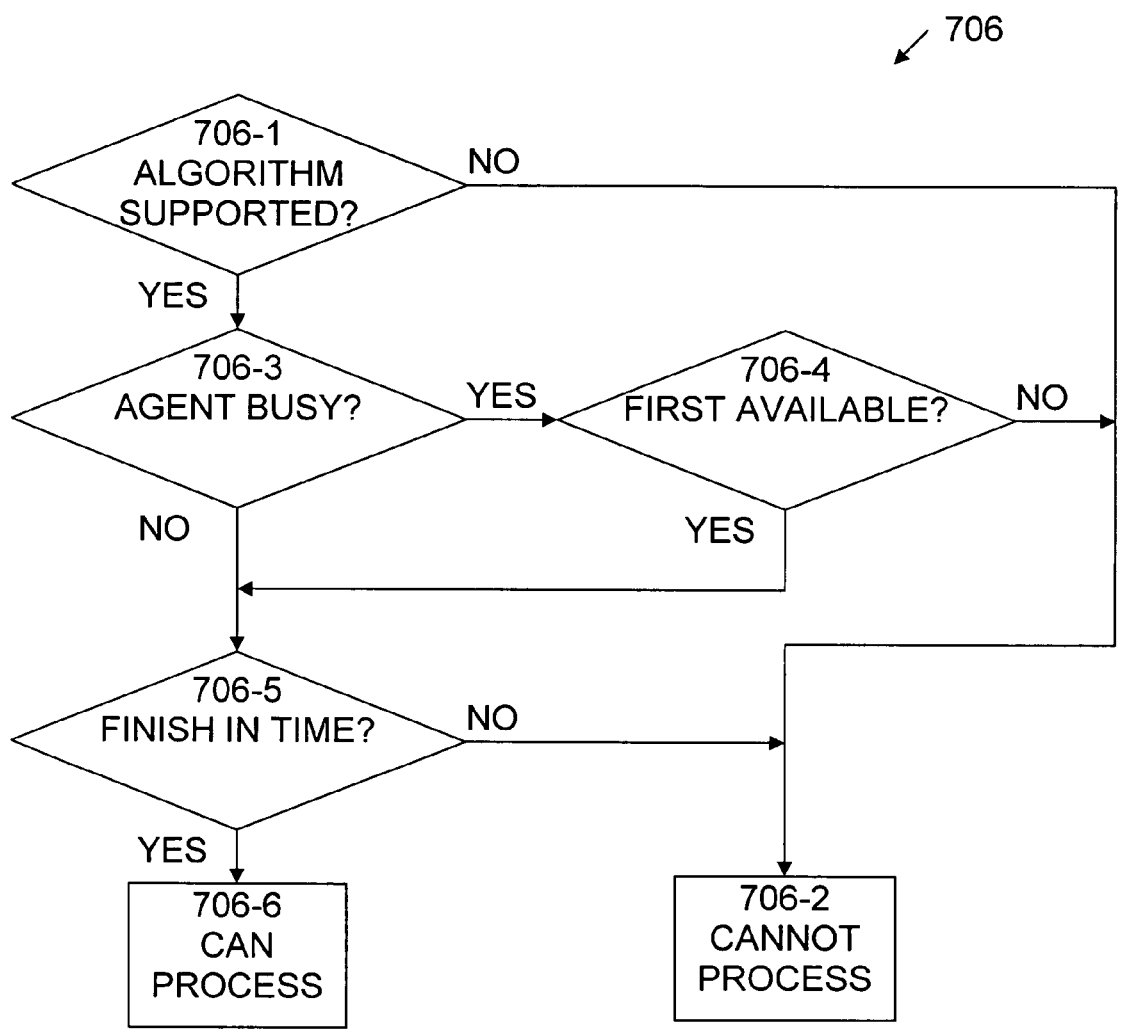
FIG. 8 is an exemplary flow diagram of a process performed by a step of the data mining processing task request selection process shown in FIG. 7.

A flow diagram of a process performed by step 706, shown in FIG. 7, in which peek at queue process 608A determines if its associated data mining agent, data mining agent 602A, is capable of processing each particular request, is shown in FIG. 8. The process of step 706 begins with step 706-1, in which it is determined whether the data mining agent supports the algorithm or algorithms that are required to process the particular request for data mining process being examined. For example, there may be data defined in, or associated with, the data mining agent, which defines the algorithms that are supported by the data mining agent. Likewise, the request for data mining processing may include data that defines, explicitly or implicitly, one or more algorithms that must be performed in order to perform the requested processing. An example may include XML data stored in the data mining agent that defines the algorithms supported by the data mining agent and XML data in the request for data mining processing that defines the algorithms that are required to process the request. In this case, a simple comparison of the XML definitions should suffice to determine whether the data mining agent supports the algorithm or algorithms that are required to process the particular request for data mining process being examined. If the request for data mining processing includes data that implicitly defines the algorithms that must be performed in order to perform the requested processing, a more complex process must be performed in order to determine whether the data mining agent supports the algorithm or algorithms that are required to process the particular request for data mining process being examined.

If, in step 706-1, it is determined that the data mining agent does not support the algorithm or algorithms that are required to process the particular request for data mining process being examined, then the process of step 706 continues with step 706-2, in which it is determined that the local computer system cannot process the particular request being examined. If, in step 706-1, it is determined that the data mining agent does support the algorithm or algorithms that are required to process the particular request for data mining process being examined, then the process of step 706 continues with step 706-3, in which it is determined whether the computer system upon which the associated data mining agent resides is currently busy and thus unavailable to accept additional processing. The definition of busy may be adjusted as desired. For example, a computer system may be defined as busy if it is performing any processing at all. On the other hand, a computer system may be defined as busy only if the available idle time of the computer system is less than some predefined or some dynamically calculated threshold. Likewise, in an embodiment in which one or more computer systems have more than one processor, the busy condition of each processor may be used instead.

An enhancement to step 706-3 is to determine the busy condition of the local computer system relative to other computer systems that may be utilized, rather than absolutely. For example, it may be determined whether the local computer system is more or less busy than other computer systems that might process the request. If other computer systems are more busy, then it may be determined, in step 706-3, that the local computer system is relatively not busy. Conversely, if other computer systems are less busy, then it may be determined, in step 706-3, that the local computer system is relatively busy. The relative busy conditions of the involved computer systems may be determined based on a variety of factors. For example, the processing load on each computer system may be considered, along with the processing speed of each computer system. The involved computer systems may exchange messages indicating these and other parameters, which may be compared by the data mining agents on each computer system. For example, each involved computer system may transmit a message in XML format, which may then be compared by the data mining agents on each computer system to determine the relative busy conditions of the involved computer system. The determinations may be made based on different algorithms, parameters, or thresholds by the various data mining agents. Thus, different data mining agents may generate different determinations of relative busy conditions.

However the determination of the busy condition of the local computer system is made, if, in step 706-3, it is determined that the local computer system is busy, then the process of step 706 continues with step 706-4, in which it is determined whether the local computer system is the first computer system that will become available for additional processing. The data mining agent first estimates the time to availability of the computer system upon which it resides. This estimate is performed based on factors such as estimated completion times of the processing jobs currently running on the computer system upon which the data mining agent resides. Each processing algorithm, such as data mining algorithms and others, provides estimates of completion times and also provides regular updates to those estimates. After the data mining agent has produced an estimate of the availability of the computer system upon which it resides, the data mining agent then exchanges estimates with other data mining agents and determines its availability relative to other data mining agents. If, in step 706-4, it is determined that the data mining agent is not the first, or is not among the first number, of data mining agents that will become available, then the process of step 700 continues with step 706-2, in which it is determined that the local computer system cannot process the particular request being examined.

If, in step 706-4, it is determined that the data mining agent is the first, or is among the first number, of data mining agents that will become available, then the process of step 700 continues with step 706-5. Likewise, if in step 706-3, it is determined that the local computer system is not busy, then the process of step 706 continues with step 706-5. In step 706-5, it is determined whether the local computer system will be able to complete the requested processing in the allotted time. The request for data mining processing that is being examined may include time allocation information indicating a time that the processing must be completed or a total amount of processing time to be allocated to the task. The data mining agent generates an estimate of the time to completion of the task if the processing were performed on the computer system upon which the data mining agent resides. This estimate is then compared with the time allocation information included in the request for data mining processing. If it is determined that the local computer system will be able to complete the requested processing in the allotted time, then process 700 continues with step 706-6, in which it is determined that the local computer system can process the particular request being examined. If it is determined that the local computer system will not be able to complete the requested processing in the allotted time, then process 700 continues with step 706-2, in which it is determined that the local computer system cannot process the particular request being examined.

If no data mining agent accepts a request for data mining processing within a defined time limit, a timeout response may be transmitted to the entity that issued the request, the requestor. The time limit may be defined in the processing request itself, or it may be defined by a default value for the system MOR, or the particular request queue in which the processing request is queued. The timeout response allows the requester to perform alternate or error processing in the event the processing request is not accepted for processing.

An important feature of the present invention is the mobility of data mining processing from data mining agent to other agents and from one computer system to another. In particular, one or more data mining processing tasks that are being processed may be migrated to other computer systems under certain circumstances. For example, a computer system upon which a data mining agent resides may become overloaded, which would result in some or all of the tasks being processed by that computer system to be completed late or not completed at all. In this situation, the data mining agent, which is monitoring its environment, will detect the overload condition and may transfer the data mining processing task that it is processing to another computer system.

Figure 9:
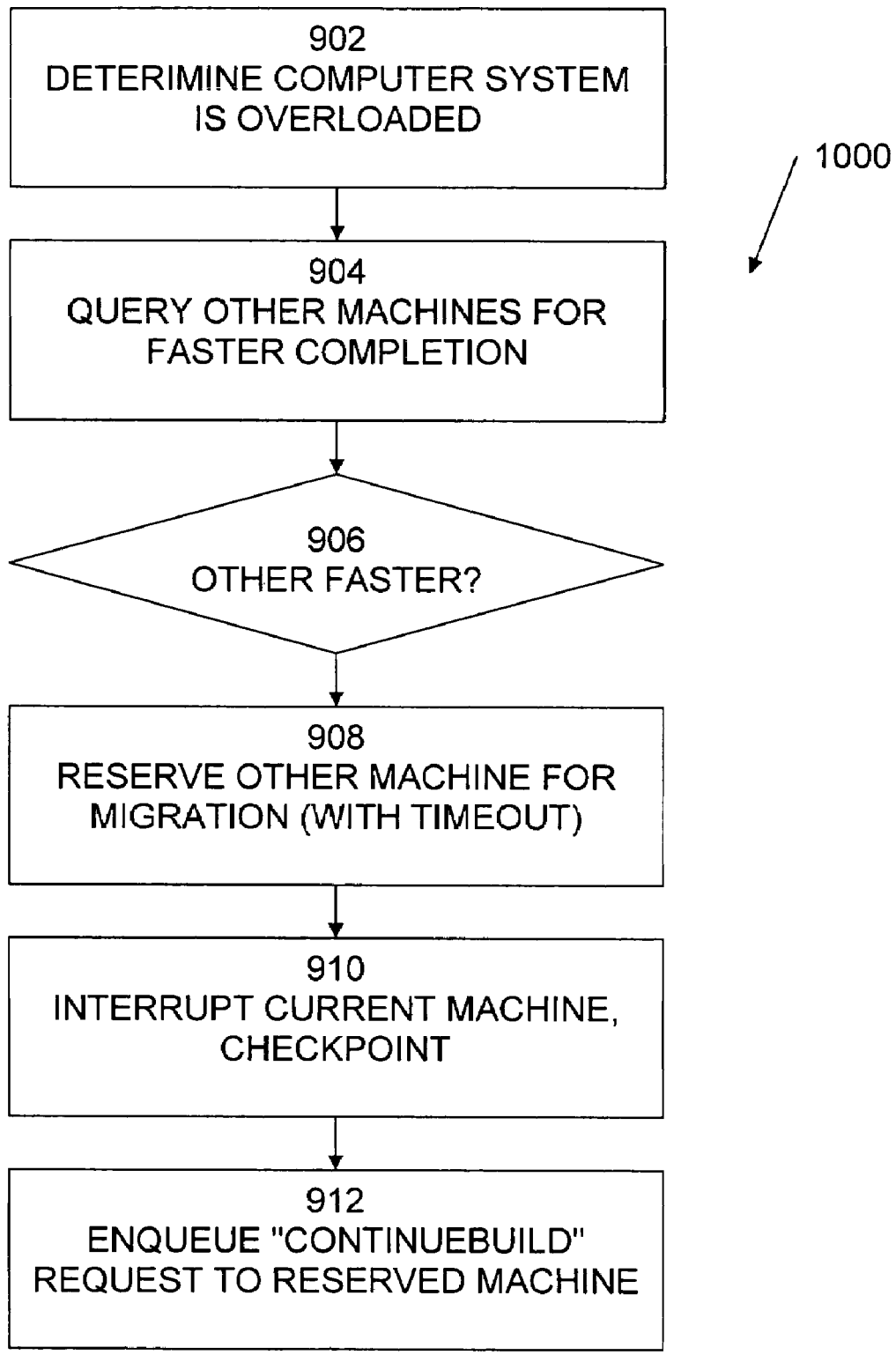
FIG. 9 is an exemplary flow diagram of one embodiment of a data mining processing task migration process, according to the present invention.

A flow diagram of one embodiment of a data mining processing task migration process 900 is shown in FIG. 9. The process begins with step 902, in which a local data mining agent determines that the local computer system, upon which the local data mining agent resides, and which is processing the current task of the local data mining agent, is overloaded. The local data mining agent may determine overloading in a number of ways, but typically, processor (CPU) utilization is the preferred measure. For example, a threshold CPU utilization may be set, such as if the CPU utilization is greater than a predefined percentage for a predefined number of seconds, then an overload condition exists.

In step 904, the local data mining agent queries other computer systems to determine if any other computer systems can complete the current task of the local data mining agent more quickly than the local computer system. To do this, the local data mining agent generates an estimate of the time the task would take to complete if the processing were performed on the local computer system. This estimate involves estimating the amount of processing that must be performed to complete the data mining processing task and an estimate of the CPU utilization available to process the data mining processing task. The time to complete processing of the data mining processing task may then be estimated based on the estimate of the amount of processing that must be performed, the estimate of available CPU utilization, and the speed of the CPU. The data mining agent also transmits queries to other computer systems. Typically, the queries request from other data mining agents information such as the speeds of the computer systems upon which the other data mining agents reside and estimates of CPU utilization that the computer systems upon which the other data mining agents reside could provide to process the data mining processing task. In some cases, there may not be any data mining agents running on a computer system that receives a query, even though the computer system is available for performing data mining processing. In this situation, other software on the computer system can respond to the query.

In step 906, the local data mining agent determines whether another computer system could complete the data mining processing task faster than the local computer system. To do this, the local data mining agent computes estimates of times to complete the data mining processing task based on the amount of processing that must be performed to complete the data mining processing task, the speed of the other computer systems, and estimates of CPU utilization of the other computer systems.

Alternatively, the queries transmitted to the other data mining agents may include information relating to the amount of processing that must be performed to complete the data mining processing task. The other data mining agents would then compute estimates of times to complete the data mining processing task based on the amount of processing that must be performed to complete the data mining processing task, the speed of the other computer systems, and estimates of CPU utilization of the other computer systems. The responses to the queries would include these completion time estimates.

In either case, the local data mining agent then adds estimates of the time it would take to migrate the data mining processing task to another computer system to the estimated completion times for the other computer systems. The local data mining agent then compares the estimated completion time for the local computer system with the estimated completion times for the other computer systems to determine whether another computer system could complete the data mining processing task faster than the local computer system. If, in step 906, the local data mining agent determines that the computer system upon which it resides could complete the data mining processing task faster than any other computer system, then process 900 ends and the data mining processing task is not migrated.

If in step 906, the local data mining agent determines that another computer system could complete the data mining processing task faster than the local computer system, then process 900 continues with step 908, in which the local data mining agent selects the computer system with the fastest completion time and reserves that computer system for migration of the data mining processing task. If there are one or more data mining agents running on the selected computer system, one of those data mining agents may receive and accept the reservation. Alternatively, other software on the selected computer system may receive and accept the reservation, whether data mining agents are running on the selected computer system or not. If there are no data mining agents running on the selected computer system, then the software that receives and accepts the reservation is responsible for launching a data mining agent to handle the data mining processing.

In step 910, the local data mining agent interrupts the processing of the data mining processing task that is being performed on the local computer system. The data mining processing task is checkpointed, that is, all input data, processing state information, and output data that is required to resume processing of the data mining processing task is saved. In step 912, the local data mining agent enqueues a "continueBuild" request in a request queue that serves the selected computer system, to which the data mining processing task is migrating. The continueBuild request typically references the checkpointed data that is needed to resume processing of the data mining processing task. When a data mining agent on the computer system to which the data mining processing task is migrating dequeues the continueBuild request, the reference to the checkpointed information is used to actually transfer the checkpointed information to the computer system to which the data mining processing task is migrating. Alternatively, the checkpointed information may be included with the continueBuild request.

Figure 10:
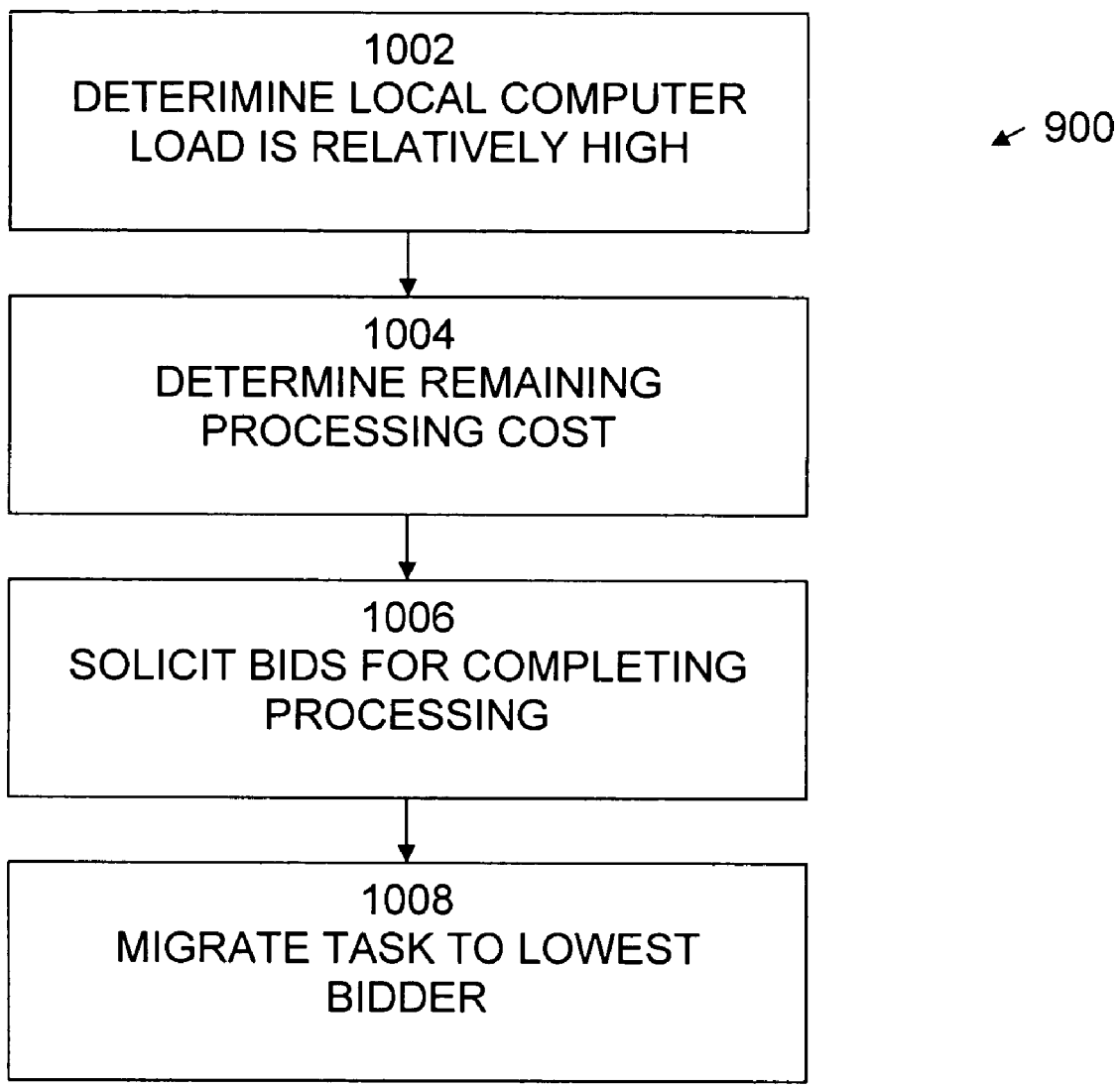
FIG. 10 is an exemplary flow diagram of one embodiment of a data mining processing task migration process, according to the present invention.

A flow diagram of one embodiment of a data mining processing task migration process 1000 is shown in FIG. 10. In this embodiment, the data mining agents communicate with each other on a regular basis, so that computer system utilization can be easily coordinated among the data mining agents. Process 1000 begins with step 1002, in which a local data mining agent determines that the local computer system, upon which the local data mining agent resides, and which is processing the current task of the local data mining agent, has a high load relative to other computer systems. The local data mining agent may determine load in a number of ways, but typically, processor (CPU) utilization is the preferred measure. Data mining agents communicate loading information with each other on a regular basis. In particular, it may determined that the processing load of the local computer system is high relative to the processing loads of other computer systems by determining a processor utilization of the local computer system, determining processor utilizations of the other computer systems, and determining that the processor utilization of the local computer system is greater than a predefined amount higher than the processor utilization of the other computer systems.

In step 1004, the local data mining agent determines the remaining cost of completing processing of the data mining processing task on the local computer system. The cost of completing processing may be based solely on the time it would take to complete processing, or it may be based on additional factors, such as actual costs that must be paid for use of computing equipment, etc. In order to determine the time it would take to complete processing, the local data mining agent generates an estimate of the time the task would take to complete if the processing were performed on the local computer system. This estimate involves estimating the amount of processing that must be performed to complete the data mining processing task and an estimate of the CPU utilization that will be used to process the data mining processing task. In addition, the local data mining agent may estimate other factors, such as actual costs that must be paid for use of computing equipment, etc.

In step 1006, the local data mining agent solicits bids for completing processing of the data mining processing task from other computer systems. Typically, the requests for bids transmitted to the other data mining agents include information relating to the amount of processing that must be performed to complete the data mining processing task. The other data mining agents would then submit bids to the local data mining agent. The bids would include estimates of the costs of completing the data mining processing task on each of the other computer systems. In order to generate a bid, a data mining agent would compute estimates of costs to complete the data mining processing task that are based on the amount of time that is needed to complete the migrated task and may also be based on other factors, such as the cost of processing on the computer system. The time to complete the migrated task includes both the time needed to complete the processing and the time needed to migrate the task from one computer system to another. The time needed to complete the processing is based on the amount of processing that must be performed to complete the data mining processing task, the speed of the other computer systems, and estimates of CPU utilization of the other computer systems.

In some cases, there may not be any data mining agents running on a computer system that receives a request for a bid, even though the computer system is available for performing data mining processing. In this situation, other software on the computer system can generate and transmit the bid.

In step 1008, the local data mining agent determines whether another computer system has a bid that is lower than the cost to complete the data mining processing task on the local computer system. To do this, the local data mining agent compares the determination of the cost of completing processing of the data mining processing task on the local computer system with the bids received from the other computer systems. If any of the received bids are significantly lower than the cost of completing processing of the data mining processing task on the local computer system, the local data mining agent migrates the remaining processing of the data mining processing task to the lowest bidder among the other computer systems. In order to carry out the migration, the local data mining agent interrupts the processing of the data mining processing task that is being performed on the local computer system. The data mining processing task is checkpointed, that is, all input data, processing state information, and output data that is required to resume processing of the data mining processing task is saved. The data mining agent enqueues a "continueBuild" request in a request queue that serves the computer system to which the data mining processing task is migrating. The continueBuild request typically references the checkpointed data that is needed to resume processing of the data mining processing task. When a data mining agent on the computer system to which the data mining processing task is migrating dequeues the continueBuild request, the reference to the checkpointed information is used to actually transfer the checkpointed information to the computer system to which the data mining processing task is migrating. Alternatively, the checkpointed information may be included with the continueBuild request.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method of data mining comprising the steps of:
    determining that the computer system is overloaded due to tasks being executed by the computer system and causing degradation in performance of processing at least one task;
    querying at least one other computer system to determine whether the at least one other computer system can complete a data mining processing task being performed on the computer system faster than the computer system;
    determining whether the at least one other computer system can complete the data mining processing task being performed on the computer system faster than the computer system; and
    if the at least one other computer system can complete the data mining processing task faster than the computer system, migrating the processing from the computer system to the at least one other computer system and generating output from the data mining processing task.

2. The method of claim 1, wherein the migrating step comprises the steps of:
    reserving the at least one other computer system for migration;
    interrupting and checkpointing the data mining processing task on the computer system; and
    enqueueing a request to the at least one other computer system for continued processing of the data mining processing task.

3. The method of claim 2, wherein the step of determining that the computer system is overloaded comprises the step of:
    determining that the computer system is overloaded when a utilization of a processor of the computer system is greater than a predefined threshold for a predefined time.

4. The method of claim 3, wherein the querying step comprises the step of: generating an estimate of a time to complete the data mining processing task.

5. The method of claim 4, wherein the generating step comprises the steps of:
    estimating an amount of processing that must be performed to complete the data mining processing task;
    estimating a processor utilization that will be available to process the data mining processing task; and
    estimating a time to complete the data mining processing task based on the estimate of the amount of processing that must be performed, the estimate of available processor utilization, and a speed of the processor.

6. The method of claim 5, wherein the querying step farther comprises the step of:
    requesting information from the at least one other computer system, the information including a speed of the at least one other computer system and an estimate of processor utilization of the at least one other computer system.

7. The method of claim 6, wherein the step of determining whether the at least one other computer system can complete a data mining processing task being performed on the computer system faster than the computer system comprises the step of:
    estimating a time to complete the data mining processing task for the at least one other computer system based on the estimate of the amount of processing that must be performed to complete the data mining processing task, the speed of the at least one other computer system and the estimate of processor utilization of the at least one other computer system.

8. The method of claim 7, wherein the step of determining whether the at least one other computer system can complete a data mining processing task being performed on the computer system faster than the computer system further comprises the steps of:
    adding an estimate of a time to migrate the data mining processing task to the at least one other computer system and the estimate of the time to complete the data mining processing task for the at least one other computer system;
    comparing the estimate of the time to complete the data mining processing task for the computer system with the estimate of the time to complete the data mining processing task for the at least one other computer system; and
    determining whether the at least one other computer system can complete the data mining processing task being performed on the computer system faster than the computer system.

9. The method of claim 5, wherein the querying step further comprises the step of:
    transmitting to the at least one other computer system the estimate of the amount of processing that must be performed to complete the data mining processing task; and
    receiving from the at least one other computer system an estimate of a time to complete the data mining processing task for the at least one other computer system.

10. The method of claim 9, wherein the step of determining whether the at least one other computer system can complete a data mining processing task being performed on the computer system faster than the computer system further comprises the steps of:
    adding an estimate of a time to migrate the data mining processing task to the at least one other computer system and the estimate of the time to complete the data mining processing task for the at least one other computer system;
    comparing the estimate of the time to complete the data mining processing task for the computer system with the estimate of the time to complete the data mining processing task for the at least one other computer system; and
    determining whether the at least one other computer system can complete the data mining processing task being performed on the computer system faster than the computer system.

11. A computer-implemented method of data mining comprising the steps of:
    determining that a processing load in the computer system is high relative to at least one other computer system, the processing load based on a processor utilization of the computer system due to tasks being executed by the computer system;

determining a remaining cost of completing processing of a data mining processing task being processed by the computer system;

determining whether the at least one other computer system can complete processing of the data mining processing task at a lower cost than the computer system; and if the at least one other computer system can complete processing of the data mining processing task at a lower cost than the computer system, migrating processing of the data mining processing task to the at least one computer system and generating output from the data mining processing task.

12. The method of claim 11, wherein the step of determining that a processing load in the computer system is high relative to at least one other computer system comprises the steps of:

determining a processor utilization of the computer system;

determining a processor utilization of the at least one other computer system; and determining that the processor utilization of the computer system is greater than a predefined amount higher than the processor utilization of the at least one other computer system.

13. The method of claim 12, wherein the remaining cost of completing processing of a data mining processing task is determined based on a time to complete processing of the data mining processing task.

14. The method of claim 12, wherein the remaining cost of completing processing of a data mining processing task is determined based on a time to complete processing of the data mining processing task and on additional factors, including actual costs of use of the computer system.

15. The method of claim 12, wherein the step of determining a remaining cost of completing processing of a data mining processing task being processed by the computer system comprises the steps of:

estimating an amount of processing that must be performed to complete the data mining processing task;

estimating a processor utilization that will be available to process the data mining processing task; and estimating a time to complete the data mining processing task based on the estimate of the amount of processing that must be performed, the estimate of available processor utilization, and a speed of the processor.

16. The method of claim 15, further comprising the step of: estimating additional factors, including actual costs of use of the computer system.

17. The method of claim 15, wherein the step of determining whether the at least one other computer system can complete processing of the data mining processing task at a lower cost than the computer system comprises the step of:

soliciting a bid for completing processing of the data mining processing task from the at least one other computer system.

18. The method of claim 17, wherein the soliciting step comprises the steps of:

transmitting a request for a bid to the at least one other computer system, the request for the bid including information relating to the amount of processing that must be performed to complete the data mining processing task; and receiving a bid from the at least one other computer system, the bid including an estimate of a cost of completing processing of the data mining processing task on the at least one other computer system.

19. A computer system for performing data mining, comprising: a processor operable to execute computer program instructions;

a memory operable to store computer program instructions executable by the processor; and a data mining agent comprising computer program instructions, for performing the steps of:

determining that the computer system is overloaded due to tasks being executed by the computer system and causing degradation in performance of processing at least one task, querying at least one other computer system to determine whether the at least one other computer system can complete a data mining processing task being performed on the computer system faster than the computer system, determining whether the at least one other computer system can complete the data mining processing task being performed on the computer system faster than the computer system, and if the at least one other computer system can complete the data mining processing task faster than the computer system, migrating the processing from the computer system to the at least one other computer system.

20. The system of claim 19, wherein the migrating step comprises the steps of:

reserving the at least one other computer system for migration;

interrupting and checkpointing the data mining processing task on the computer system; and enqueueing a request to the at least one other computer system for continued processing of the data mining processing task.

21. The system of claim 20, wherein the step of determining that the computer system is overloaded comprises the step of:

determining that the computer system is overloaded when a utilization of a processor of the computer system is greater than a predefined threshold for a predefined time.

22. The system of claim 21, wherein the querying step comprises the step of:

generating an estimate of a time to complete the data mining processing task.

23. The system of claim 22, wherein the generating step comprises the steps of:

estimating an amount of processing that must be performed to complete the data mining processing task;

estimating a processor utilization that will be available to process the data mining processing task; and estimating a time to complete the data mining processing task based on the estimate of the amount of processing that must be performed, the estimate of available processor utilization, and a speed of the processor.

24. The system of claim 23, wherein the querying step further comprises the step of:

requesting information from the at least one other computer system, the information including a speed of the at least one other computer system and an estimate of processor utilization of the at least one other computer system.

25. The system of claim 24, wherein the step of determining whether the at least one other computer system can complete a data mining processing task being performed on the computer system faster than the computer system comprises the step of:

estimating a time to complete the data mining processing task for the at least one other computer system based on the estimate of the amount of processing that must be performed to complete the data mining processing task, the speed of the at least one other computer system and the estimate of processor utilization of the at least one other computer system.

26. The system of claim 25, wherein the step of determining whether the at least one other computer system can complete a data mining processing task being performed on the computer system faster than the computer system further comprises the steps of:
  adding an estimate of a time to migrate the data mining processing task to the at least one other computer system and the estimate of the time to complete the data mining processing task for the at least one other computer system;
  comparing the estimate of the time to complete the data mining processing task for the computer system with the estimate of the time to complete the data mining processing task for the at least one other computer system; and
  determining whether the at least one other computer system can complete the data mining processing task being performed on the computer system faster than the computer system.

27. The system of claim 23, wherein the querying step farther comprises the step of:
  transmitting to the at least one other computer system the estimate of the amount of processing that must be performed to complete the data mining processing task; and
  receiving from the at least one other computer system an estimate of a time to complete the data mining processing task for the at least one other computer system.

28. The system of claim 27, wherein the step of determining whether the at least one other computer system can complete a data mining processing task being performed on the computer system faster than the computer system further comprises the steps of:
  adding an estimate of a time to migrate the data mining processing task to the at least one other computer system and the estimate of the time to complete the data mining processing task for the at least one other computer system;
  comparing the estimate of the time to complete the data mining processing task for the computer system with the estimate of the time to complete the data mining processing task for the at least one other computer system; and
  determining whether the at least one other computer system can complete the data mining processing task being performed on the computer system faster than the computer system.

29. A computer system for performing data mining, comprising: a
  processor operable to execute computer program instructions;
  a memory operable to store computer program instructions executable by the processor; and
  a data mining agent comprising computer program instructions, for performing the steps of:
    determining that a processing load in the computer system is high relative to at least one other computer system, the processing load based on a processor utilization of the computer system due to tasks being executed by the computer system,
    determining a remaining cost of completing processing of a data mining processing task being processed by the computer system,
    determining whether the at least one other computer system can complete processing of the data mining processing task at a lower cost than the computer system, and
    if the at least one other computer system can complete processing of the data mining processing task at a lower cost than the computer system, migrating processing of the data mining processing task to the at least one computer system.

30. The system of claim 29, wherein the step of determining that a processing load in the computer system is high relative to at least one other computer system comprises the steps of:
  determining a processor utilization of the computer system;
  determining a processor utilization of the at least one other computer system; and
  determining that the processor utilization of the computer system is greater than a predefined amount higher than the processor utilization of the at least one other computer system.

31. The system of claim 30, wherein the remaining cost of completing processing of a data mining processing task is determined based on a time to complete processing of the data mining processing task.

32. The system of claim 30, wherein the remaining cost of completing processing of a data mining processing task is determined based on a time to complete processing of the data mining processing task and on additional factors, including actual costs of use of the computer system.

33. The system of claim 30, wherein the step of determining a remaining cost of completing processing of a data mining processing task being processed by the computer system comprises the steps of:
  estimating an amount of processing that must be performed to complete the data mining processing task;
  estimating a processor utilization that will be available to process the data mining processing task; and
  estimating a time to complete the data mining processing task based on the estimate of the amount of processing that must be performed, the estimate of available processor utilization, and a speed of the processor.

34. The system of claim 33, further comprising the step of: estimating additional factors, including actual costs of use of the computer system.

35. The system of claim 33, wherein the step of: determining whether the at least one other computer system can complete processing of the data mining processing task at a lower cost than the computer system comprises the step of:
  soliciting a bid for completing processing of the data mining processing task from the at least one other computer system.

36. The system of claim 35, wherein the soliciting step comprises the steps of:
  transmitting a request for a bid to the at least one other computer system, the request for the bid including information relating to the amount of processing that must be performed to complete the data mining processing task; and
  receiving a bid from the at least one other computer system, the bid including an estimate of a cost of completing processing of the data mining processing task on the at least one other computer system.

37. A computer program product for performing data mining in a computer system, comprising:
  a volatile or non-volatile computer readable storage medium;

computer program instructions, recorded on the computer readable storage medium, executable by a processor, for performing the steps of:

determining that the computer system is overloaded due to tasks being executed by the computer system and causing degradation in performance of processing at least one task;

querying at least one other computer system to determine whether the at least one other computer system can complete a data mining processing task being performed on the computer system faster than the computer system;

determining whether the at least one other computer system can complete the data mining processing task being performed on the computer system faster than the computer system; and if the at least one other computer system can complete the data mining processing task faster than the computer system, migrating the processing from the computer system to the at least one other computer system and generating output from the data mining processing task.

38. The computer program product of claim 37, wherein the migrating step comprises the steps of:

reserving the at least one other computer system for migration;

interrupting and checkpointing the data mining processing task on the computer system; and enqueueing a request to the at least one other computer system for continued processing of the data mining processing task.

39. The computer program product of claim 38, wherein the step of determining that the computer system is overloaded comprises the step of:

determining that the computer system is overloaded when a utilization of a processor of the computer system is greater than a predefined threshold for a predefined time.

40. The computer program product of claim 39, wherein the querying step comprises the step of: generating an estimate of a time to complete the data mining processing task.

41. The computer program product of claim 40, wherein the generating step comprises the steps of:

estimating an amount of processing that must be performed to complete the data mining processing task;

estimating a processor utilization that will be available to process the data mining processing task; and estimating a time to complete the data mining processing task based on the estimate of the amount of processing that must be performed, the estimate of available processor utilization, and a speed of the processor.

42. The computer program product of claim 41, wherein the querying step farther comprises the step of:

requesting information from the at least one other computer system, the information including a speed of the at least one other computer system and an estimate of processor utilization of the at least one other computer system.

43. The computer program product of claim 42, wherein the step of determining whether the at least one other computer system can complete a data mining processing task being performed on the computer system faster than the computer system comprises the step of:

estimating a time to complete the data mining processing task for the at least one other computer system based on the estimate of the amount of processing that must be performed to complete the data mining processing task, the speed of the at least one other computer system and the estimate of processor utilization of the at least one other computer system.

44. The computer program product of claim 43, wherein the step of determining whether the at least one other computer system can complete a data mining processing task being performed on the computer system faster than the computer system farther comprises the steps of:

adding an estimate of a time to migrate the data mining processing task to the at least one other computer system and the estimate of the time to complete the data mining processing task for the at least one other computer system;

comparing the estimate of the time to complete the data mining processing task for the computer system with the estimate of the time to complete the data mining processing task for the at least one other computer system; and determining whether the at least one other computer system can complete the data mining processing task being performed on the computer system faster than the computer system.

45. The computer program product of claim 41, wherein the querying step farther comprises the step of:

transmitting to the at least one other computer system the estimate of the amount of processing that must be performed to complete the data mining processing task; and receiving from the at least one other computer system an estimate of a time to complete the data mining processing task for the at least one other computer system.

46. The computer program product of claim 45, wherein the step of determining whether the at least one other computer system can complete a data mining processing task being performed on the computer system faster than the computer system farther comprises the steps of:

adding an estimate of a time to migrate the data mining processing task to the at least one other computer system and the estimate of the time to complete the data mining processing task for the at least one other computer system;

comparing the estimate of the time to complete the data mining processing task for the computer system with the estimate of the time to complete the data mining processing task for the at least one other computer system; and determining whether the at least one other computer system can complete the data mining processing task being performed on the computer system faster than the computer system.

47. A computer program product for performing data mining in a computer system, comprising:

a volatile or non-volatile computer readable storage medium;

computer program instructions, recorded on the computer readable storage medium, executable by a processor, for performing the steps of:

determining that a processing load in the computer system is high relative to at least one other computer system, the processing load based on a processor utilization of the computer system due to tasks being executed by the computer system;

determining a remaining cost of completing processing of a data mining processing task being processed by the computer system;

determining whether the at least one other computer system can complete processing of the data mining processing task at a lower cost than the computer system; and if the at least one other computer system can complete processing of the data mining processing task at a lower cost than the computer system, migrating processing of the data mining processing task to the at least one computer system and generating output from the data mining processing task.

48. The computer program product of claim 47, wherein the step of determining that a processing load in the computer system is high relative to at least one other computer system comprises the steps of:
determining a processor utilization of the computer system;
determining a processor utilization of the at least one other computer system; and
determining that the processor utilization of the computer system is greater than a predefined amount higher than the processor utilization of the at least one other computer system.

49. The computer program product of claim 48, wherein the remaining cost of completing processing of a data mining processing task is determined based on a time to complete processing of the data mining processing task.

50. The computer program product of claim 48, wherein the remaining cost of completing processing of a data mining processing task is determined based on a time to complete processing of the data mining processing task and on additional factors, including actual costs of use of the computer system.

51. The computer program product of claim 48, wherein the step of determining a remaining cost of completing processing of a data mining processing task being processed by the computer system comprises the steps of:
estimating an amount of processing that must be performed to complete the data mining processing task;
estimating a processor utilization that will be available to process the data mining processing task; and
estimating a time to complete the data mining processing task based on the estimate of the amount of processing that must be performed, the estimate of available processor utilization, and a speed of the processor.

52. The computer program product of claim 51, further comprising the step of: estimating additional factors, including actual costs of use of the computer system.

53. The computer program product of claim 51, wherein the step of determining whether the at least one other computer system can complete processing of the data mining processing task at a lower cost than the computer system comprises the step of:
soliciting a bid for completing processing of the data mining processing task from the at least one other computer system.

54. The computer program product of claim 53, wherein the soliciting step comprises the steps of:
transmitting a request for a bid to the at least one other computer system, the request for the bid including information relating to the amount of processing that must be performed to complete the data mining processing task; and
receiving a bid from the at least one other computer system, the bid including an estimate of a cost of completing processing of the data mining processing task on the at least one other computer system.

55. A data mining agent for managing data mining in a computer system, the data mining agent stored in a memory of the computer system and executed by a processor of the computer system wherein the memory is coupled to the processor and the data mining agent comprises:
means for determining that the computer system is overloaded due to tasks being executed by the computer system and causing degradation in performance of processing at least one task;
means for querying at least one other computer system to determine whether the at least one other computer system can complete a data mining processing task being performed on the computer system faster than the computer system;
means for determining whether the at least one other computer system can complete the data mining processing task being performed on the computer system faster than the computer system; and
means for migrating the processing from the computer system to the at least one other computer system, if the at least one other computer system can complete the data mining processing task faster than the computer system.

56. The data mining agent of claim 55, wherein the migrating means comprises:
means for reserving the at least one other computer system for migration;
means for interrupting and checkpointing the data mining processing task on the computer system; and
means for enqueueing a request to the at least one other computer system for continued processing of the data mining processing task.

57. The data mining agent of claim 56, wherein the means for determining that the computer system is overloaded comprises:
means for determining that the computer system is overloaded if a utilization of a processor of the computer system is greater than a predefined threshold for a predefined time.

58. The data mining agent of claim 57, wherein the querying means comprises:
means for generating an estimate of a time to complete the data mining processing task.

59. The data mining agent of claim 58, wherein the generating means comprises:
means for estimating an amount of processing that must be performed to complete the data mining processing task;
means for estimating a processor utilization that will be available to process the data mining processing task; and
means for estimating a time to complete the data mining processing task based on the estimate of the amount of processing that must be performed, the estimate of available processor utilization, and a speed of the processor.

60. The data mining agent of claim 59, wherein the querying means farther comprises:
means for requesting information from the at least one other computer system, the information including a speed of the at least one other computer system and an estimate of processor utilization of the at least one other computer system.

61. The data mining agent of claim 60, wherein the means for determining whether the at least one other computer system can complete a data mining processing task being performed on the computer system faster than the computer system comprises:
means for estimating a time to complete the data mining processing task for the at least one other computer system based on the estimate of the amount of processing that must be performed to complete the data mining processing task, the speed of the at least one other computer system and the estimate of processor utilization of the at least one other computer system.

62. The data mining agent of claim 61, wherein the means for determining whether the at least one other computer system can complete a data mining processing task being performed on the computer system faster than the computer system farther comprises:
- means for adding an estimate of a time to migrate the data mining processing task to the at least one other computer system and the estimate of the time to complete the data mining processing task for the at least one other computer system;
- means for comparing the estimate of the time to complete the data mining processing task for the computer system with the estimate of the time to complete the data mining processing task for the at least one other computer system; and
- means for determining whether the at least one other computer system can complete the data mining processing task being performed on the computer system faster than the computer system.

63. The data mining agent of claim 59, wherein the querying means farther comprises:
- means for transmitting to the at least one other computer system the estimate of the amount of processing that must be performed to complete the data mining processing task; and
- means for receiving from the at least one other computer system an estimate of a time to complete the data mining processing task for the at least one other computer system.

64. The data mining agent of claim 63, wherein the means for determining whether the at least one other computer system can complete a data mining processing task being performed on the computer system faster than the computer system farther comprises:
- means for adding an estimate of a time to migrate the data mining processing task to the at least one other computer system and the estimate of the time to complete the data mining processing task for the at least one other computer system;
- means for comparing the estimate of the time to complete the data mining processing task for the computer system with the estimate of the time to complete the data mining processing task for the at least one other computer system; and
- means for determining whether the at least one other computer system can complete the data mining processing task being performed on the computer system faster than the computer system.

65. A data mining agent for managing data mining in a computer system, the data mining agent stored in a memory of the computer system and executed by a processor of the computer system wherein the memory is coupled to the processor and the data mining agent comprises:
- means for determining that a processing load in the computer system is high relative to at least one other computer system, the processing load based on a processor utilization of the computer system due to tasks being executed by the computer system;
- means for determining a remaining cost of completing processing of a data mining processing task being processed by the computer system;
- means for determining whether the at least one other computer system can complete processing of the data mining processing task at a lower cost than the computer system; and
- means for migrating processing of the data mining processing task to the at least one computer system, the at least one other computer system can complete processing of the data mining processing task at a lower cost than the computer system.

66. The data mining agent of claim 65 wherein the step of determining that a processing load in the computer system is high relative to at least one other computer system comprises:
- means for determining a processor utilization of the computer system;
- means for determining a processor utilization of the at least one other computer system; and
- means for determining that the processor utilization of the computer system is greater than a predefined amount higher than the processor utilization of the at least one other computer system.

67. The data mining agent of claim 66, wherein the remaining cost of completing processing of a data mining processing task is determined based on a time to complete processing of the data mining processing task.

68. The data mining agent of claim 66, wherein the remaining cost of completing processing of a data mining processing task is determined based on a time to complete processing of the data mining processing task and on additional factors, including actual costs of use of the computer system.

69. The data mining agent of claim 66, wherein the means for determining a remaining cost of completing processing of a data mining processing task being processed by the computer system comprises:
- means for estimating an amount of processing that must be performed to complete the data mining processing task;
- means for estimating a processor utilization that will be available to process the data mining processing task; and
- means for estimating a time to complete the data mining processing task based on the estimate of the amount of processing that must be performed, the estimate of available processor utilization, and a speed of the processor.

70. The data mining agent of claim 69, further comprising: means for estimating additional factors, including actual costs of use of the computer system.

71. The data mining agent of claim 69, wherein the means for determining whether the at least one other computer system can complete processing of the data mining processing task at a lower cost than the computer system comprises:
- means for soliciting a bid for completing processing of the data mining processing task from the at least one other computer system.

72. The data mining agent of claim 71, wherein the soliciting means comprises:
- means for transmitting a request for a bid to the at least one other computer system, the request for the bid including information relating to the amount of processing that must be performed to complete the data mining processing task; and
- means for receiving a bid from the at least one other computer system, the bid including an estimate of a cost of completing processing of the data mining processing task on the at least one other computer system.

* * * * *

UNITED STATES PATENT AND TRADEMARK OFFICE
CERTIFICATE OF CORRECTION

PATENT NO. : 7,620,635 B2  Page 1 of 2
APPLICATION NO. : 11/094083
DATED : November 17, 2009
INVENTOR(S) : Mark Hornick It is certified that error appears in the above-identified patent and that said Letters Patent is hereby corrected as shown below:

In column 1, line 7, after "divisional" delete "of application".

In column 4, line 39, after "system" insert -- . --.

In column 7, line 53, after "recommendations" insert -- . --.

In column 7, line 65, after "recommendations" insert -- . --.

In column 8, line 64, delete "electromechanical" and insert -- electro-mechanical --, therefor.

In column 13, line 42, delete "requester" and insert -- requestor --, therefor.

In column 17, line 61, in claim 6, delete "farther" and insert -- further --, therefor.

In column 21, line 25, in claim 27, delete "farther" and insert -- further --, therefor.

In column 23, line 53, in claim 42, delete "farther" and insert -- further --, therefor.

In column 24, line 8, in claim 44, delete "farther" and insert -- further --, therefor.

In column 24, line 24, in claim 45, delete "farther" and insert -- further --, therefor.

In column 24, line 35, in claim 46, delete "farther" and insert -- further --, therefor.

In column 26, line 50, in claim 60, delete "farther" and insert -- further --, therefor.

In column 27, line 5, in claim 62, delete "farther" and insert -- further --, therefor.

In column 27, line 22, in claim 63, delete "farther" and insert -- further --, therefor.

Signed and Sealed this

Third Day of August, 2010

David J. Kappos
*Director of the United States Patent and Trademark Office*

CERTIFICATE OF CORRECTION (continued)
U.S. Pat. No. 7,620,635 B2

In column 27, line 35, in claim 64, delete "farther" and insert -- further --, therefor.

UNITED STATES PATENT AND TRADEMARK OFFICE
CERTIFICATE OF CORRECTION

PATENT NO. : 7,620,635 B2 Page 1 of 1
APPLICATION NO. : 11/094083
DATED : November 17, 2009
INVENTOR(S) : Mark Hornick It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 638 days.

Signed and Sealed this

Twenty-sixth Day of October, 2010

David J. Kappos
*Director of the United States Patent and Trademark Office*